(12) United States Patent
Datta et al.

(10) Patent No.: US 12,440,154 B2
(45) Date of Patent: Oct. 14, 2025

(54) COACHED BREATHING SYSTEM FOR MEDICAL IMAGING

(71) Applicant: GE Precision Healthcare LLC, Wauwatosa, WI (US)

(72) Inventors: Arka Datta, Pewaukee, WI (US); Brian Nett, Waukesha, WI (US); Chelsey Lewis, Waukesha, WI (US)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 22 days.

(21) Appl. No.: 18/329,471

(22) Filed: Jun. 5, 2023

(65) Prior Publication Data
US 2024/0398339 A1 Dec. 5, 2024

(51) Int. Cl.
*A61B 5/00* (2006.01)
*A61B 5/055* (2006.01)
(Continued)

(52) U.S. Cl.
CPC ............ *A61B 5/486* (2013.01); *A61B 5/0035* (2013.01); *A61B 5/0077* (2013.01); *A61B 5/055* (2013.01);
(Continued)

(58) Field of Classification Search
CPC ....... A61B 6/032; A61B 6/5264; A61B 5/113; A61B 5/055
See application file for complete search history.

(56) References Cited

U.S. PATENT DOCUMENTS 7,632,015 B2 12/2009 Stayman et al.
7,869,562 B2 1/2011 Khamene et al.
(Continued)

FOREIGN PATENT DOCUMENTS

CN 115299971 A 11/2022
DE 102014205702 A1 10/2015
(Continued)

OTHER PUBLICATIONS

Cerviño, L. et al., "Using surface imaging and visual coaching to improve the reproducibility and stability of deep-inspiration breath hold for left-breast-cancer radiotherapy," Physics in Medicine and Biology, vol. 54, No. 22, Nov. 21, 2009, Available Online Oct. 28, 2009, 14 pages.
(Continued)

*Primary Examiner* — Anh Tuan T Nguyen
*Assistant Examiner* — Tommy T Ly
(74) *Attorney, Agent, or Firm* — McCoy Russell LLP

(57) ABSTRACT

Methods and systems are provided for aiding a subject of a medical imaging exam in performing coached breathing. In one embodiment, a method for a medical imaging system comprises generating a three-dimensional (3-D) virtual representation of a portion of a surface of a chest and/or abdomen of a subject of the medical imaging system, the portion adjustable in size by an operator of the medical imaging system; displaying changes in the 3-D virtual representation to the subject on a display device of the medical imaging system while the subject breathes, in real time; displaying instructions to the subject on the display device to perform coached breathing in accordance with a selected breathing pattern, using the 3-D virtual representation as a guide; and in response to detecting a deviation of a breathing pattern of the subject from the selected breathing pattern, indicating the deviation to the subject.

4 Claims, 15 Drawing Sheets

(51) Int. Cl.
*A61B 6/00* (2024.01)
*A61B 6/03* (2006.01)
*A61B 6/46* (2024.01)

(52) U.S. Cl.
CPC ............... *A61B 6/466* (2013.01); *A61B 6/54* (2013.01); *A61B 6/032* (2013.01); *A61B 6/037* (2013.01)

(56) References Cited

U.S. PATENT DOCUMENTS

| | | |
|---|---|---|
| 8,417,315 B2 | 4/2013 | Mostafavi et al. |
| 8,939,920 B2 | 1/2015 | Maad |
| 10,154,823 B2 | 12/2018 | Von Berg et al. |
| 10,712,446 B1 | 7/2020 | Bills et al. |
| 10,823,955 B2 | 11/2020 | Sutton et al. |
| 11,276,166 B2 | 3/2022 | Prasad et al. |
| 2010/0074497 A1 | 3/2010 | Mielenz |
| 2016/0092078 A1* | 3/2016 | Braun ................ A61B 34/00 348/46 |
| 2019/0122073 A1 | 4/2019 | Ozdemir et al. |
| 2019/0366030 A1 | 12/2019 | Giap et al. |
| 2020/0205748 A1* | 7/2020 | Pautsch ............. A61B 6/032 |
| 2021/0110594 A1 | 4/2021 | Teixeira et al. |
| 2021/0251516 A1 | 8/2021 | Pai et al. |
| 2021/0353244 A1* | 11/2021 | Kiely ............... A61B 6/5258 |
| 2021/0373160 A1 | 12/2021 | Kalscheur |
| 2022/0015710 A1 | 1/2022 | Lewis et al. |

FOREIGN PATENT DOCUMENTS

| | | | |
|---|---|---|---|
| EP | 4176796 A1 * | 5/2023 | ............. A61B 5/113 |
| WO | 2015134521 A1 | 9/2015 | |
| WO | 2021228703 A1 | 11/2021 | |
| WO | WO-2023111914 A1 * | 6/2023 | ............ A61B 5/0205 |
| WO | WO-2023179876 A1 * | 9/2023 | ............ A61N 5/1049 |

OTHER PUBLICATIONS

Li et al., "Augmented Reality-Guided Positioning System for Radiotherapy Patients," Journal of Applied Clinical Medical Physics, vol. 23, No. 3, Mar. 2022, 11 pages.

EP application 24177076.7 filed May 21, 2024—Search Report issued Oct. 25, 2024; 8 pages.

* cited by examiner

COACHED BREATHING SYSTEM FOR MEDICAL IMAGING

TECHNICAL FIELD

Embodiments of the subject matter disclosed herein relate to medical imaging systems.

BACKGROUND

In medical imaging systems, a scanner generates signals based on detected radiation that are used to generate images of a body of a subject of a scan. The radiation may comprise X-rays that are directed towards the subject and attenuated by the subject, in the case of computed tomography (CT) imaging, or the radiation may be emitted by a radioactive tracer introduced into the subject, (in the case of positron emission tomography (PET), magnetic resonance (MR), and/or nuclear medicine (NM) imaging. The subject may be carefully positioned on table of the medical imaging system so as to detect radiation from a specific area of the patient's body that is of interest, and to avoid tissue in other areas. During a scan, a quality of a resulting image may depend on the patient's body remaining still and not moving, where movement of the patient's body during the scan may reduce the image quality.

When a scan is performed on a chest of a patient, a movement of the patient's chest due to breathing may decrease the image quality. As a result, the patient may be instructed or coached to breath in a manner that reduces the movement of the patient's chest during the scan (e.g., coached breathing). However, the patient may not follow the instructions, or may find it difficult to control their breathing. For example, a positioning of the patient within the medical imaging system may cause or increase a level of anxiety of the patient, resulting in heavier and quicker breathing.

Current methods for coached breathing may rely on a presence of a technician, which may increase a cost of performing scans. Additionally, personalized coaching may increase an amount of time used to prepare the patient for the scan, which may decrease an efficiency of use of the medical imaging system and generate scheduling delays.

Various approaches have been taken to reduce a reliance on human intervention in coaching breathing by using visual tools to aid the user in achieving control over their breathing. For example, U.S. patent application No. 20190366030 to Giap teaches using a motion detection system to capture real-time physical position data of a subject during a scan, and displaying an avatar of the subject in a virtual environment representative of the real-time physical position of the subject, such that the subject may adjust their physical position using the avatar as a guide. However, the motion detection system of Giap relies on a computationally intensive virtual reality system and positioning a plurality of locator tags and/or motion sensors on a body of the subject, which may increase a cost of performing scans, a use of computational resources, and increase an amount of preparation time of the patient.

Other approaches include using surface contour data of the patient's chest to generate a 3-D visualization of the patient's chest in real time. The 3-D visualization may be displayed to the patient, and the patient may use the 3-D visualization to control their breathing. For example, U.S. Pat. No. 7,869,562 to Khamene teaches using an optical imaging system to create a mesh topology of a patient, and displaying changes in the topology as bio-feedback for the patient to reproduce a specified respiratory state (e.g., coached breathing). W.O. 2021228703 teaches using LiDAR to determine whether a position of a body part of a patient of a medical imaging system deviates from a desired position, and use an interactive reposition guidance device configured to advise the patient to effect a desired movement of the body part via audible and visible signals.

However, the inventors herein have recognized issues with current systems for generating the 3-D visualization, such as the systems of Khamene and [ . . . ]. One problem with the current systems is that a correspondence between the 3-D visualization and breathing areas of the patient may not be sufficiently precise to coach the patient effectively. Additionally, a size and/or complexity of the optical or LiDAR imaging system used to generate the 3-D visualization may increase a size and cost of the medical imaging system and/or a cost of operating the medical imaging system. An amount of data collected by the medical imaging system due to an inclusion of the optical or LiDAR imaging system may increase, and an amount of processing performed by the medical imaging system due to the inclusion of the optical or LiDAR imaging system may increase, resulting in decreased memory and processing resources. An additional drawback of the current systems is that the 3-D visualization may not be generated during a scan, when coached breathing may be most effective. In other words, the 3-D visualization may be used for coaching the patient prior to the scan, but the patient's breathing may change during the scan, without the patient being aware of the change. As a result, the current systems may not result in a reduction of technician time and/or patient preparation time, and/or may not result in a reduction of patient movement and a corresponding increase in image quality.

SUMMARY

The current disclosure at least partially addresses one or more of the above identified issues by a method for a medical imaging system, comprising generating a three-dimensional (3-D) virtual representation of a portion of a surface of a chest and/or abdomen of a subject of the medical imaging system, the portion adjustable in size by an operator of the medical imaging system; displaying changes in the 3-D virtual representation to the subject on a display device of the medical imaging system while the subject breathes, in real time; displaying instructions to the subject on the display device to perform coached breathing in accordance with a selected breathing pattern, using the 3-D virtual representation as a guide; and in response to detecting a deviation of a breathing pattern of the subject from the selected breathing pattern, indicating the deviation to the subject.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be more clearly understood upon reading the following detailed description and upon reference to the drawings in which.

Figure 1A:
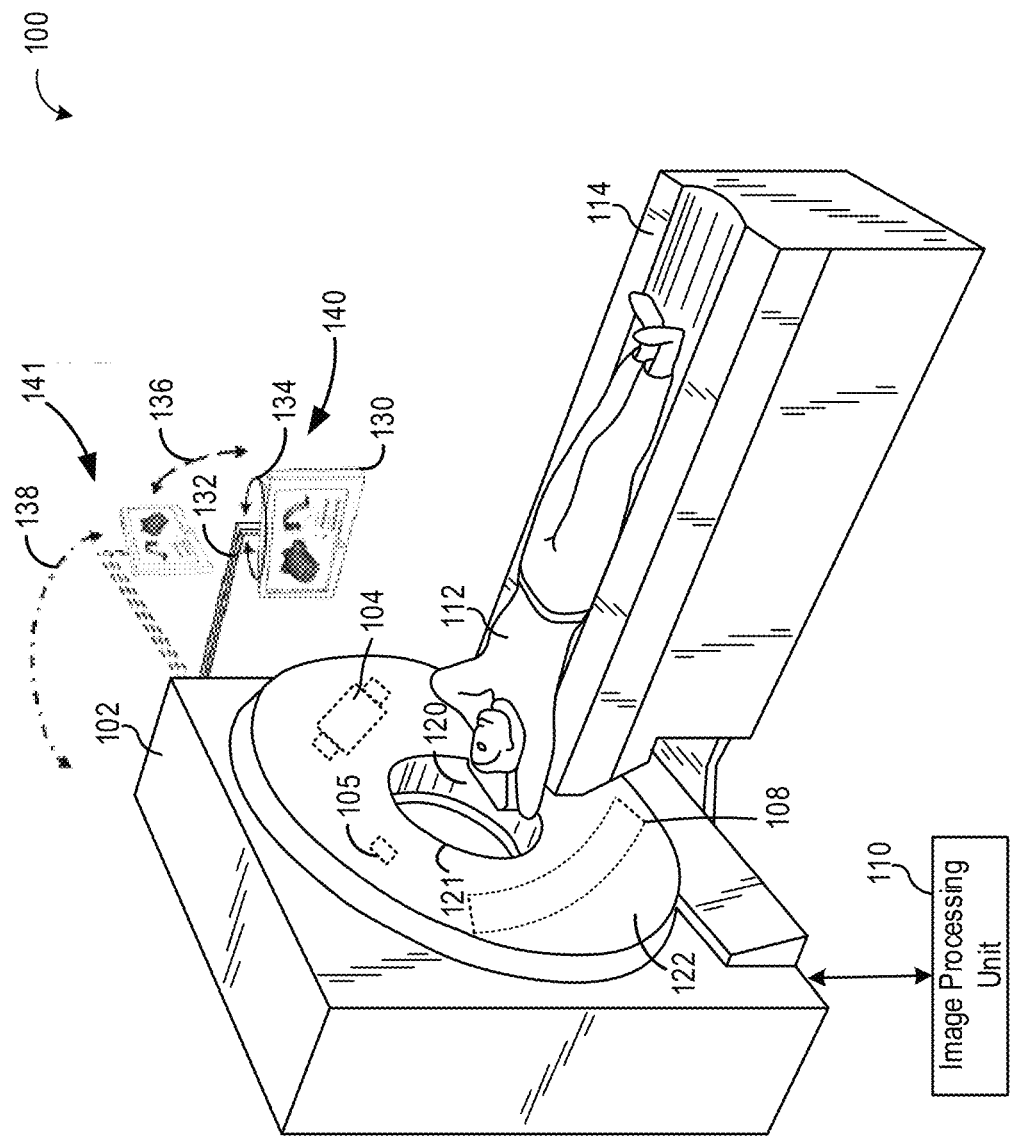
FIG. 1A shows a pictorial view of an imaging system, in accordance with one or more embodiments of the present disclosure.

The drawings illustrate specific aspects of the described systems and methods. Together with the following description, the drawings demonstrate and explain the structures, methods, and principles described herein. In the drawings, the size of components may be exaggerated or otherwise modified for clarity. Well-known structures, materials, or operations are not shown or described in detail to avoid obscuring aspects of the described components, systems and methods.

DETAILED DESCRIPTION

This description and embodiments of the subject matter disclosed herein relate to methods and systems for increasing a quality of medical images generated by a medical imaging system. The medical imaging system may be a computed tomography (CT) system, a positron emission tomography (PET) system, a magnetic resonance (MR) imaging system, a nuclear medicine (NM) imaging system, a PET/CT or PET/MR system, or a different type of imaging system. Prior to performing a scan, a subject of the scan is typically positioned on a table of the medical imaging system. A position of the table is adjusted by an operator of the medical imaging system to position the subject within the gantry. During the scan, a movement of the subject may generate noise in a resulting image, due to variations in the position of the subject while signals are being generated at the detector array. As a result, the subject may be instructed to minimize their movement, to reduce a level of the noise in the resulting image.

Minimizing the movement of the subject may include coaching the breathing of the subject, in particular, when the scan is directed at an abdomen, chest, or other areas of a body of the subject that may move during breathing. To ensure an image quality above a threshold quality, the subject may be asked to reproduce or follow a selected or target breathing pattern, referred to herein as coached breathing. The selected breathing pattern may be selected by an operator of the medical imaging system from a plurality of breathing patterns, for example, based on a scan protocol anatomical region, and/or characteristics of the subject (size, ability to hold breath, etc.). The breathing pattern may include deep breathing, shallow breathing, hyperventilating, holding one's breath, or a combination of different types of breathing including inhaling and exhaling different volumes of air. The selected breathing pattern may limit a range of motion of the abdomen, chest, or other areas during inhalation and exhalation. Specifically, the subject may be instructed to minimize an expansion of the chest during inhalation, minimize a contraction of the chest during exhalation, hold their breath for certain amounts of time, and/or take breaths at a desired rate (e.g., slowly).

Typically the subject is trained on coached breathing prior to the scan by an operator or technician of the medical imaging system, or a caregiver. After the subject is able to reproduce the selected breathing pattern within a threshold deviation, the scan may be performed on the subject.

Figure 1B:
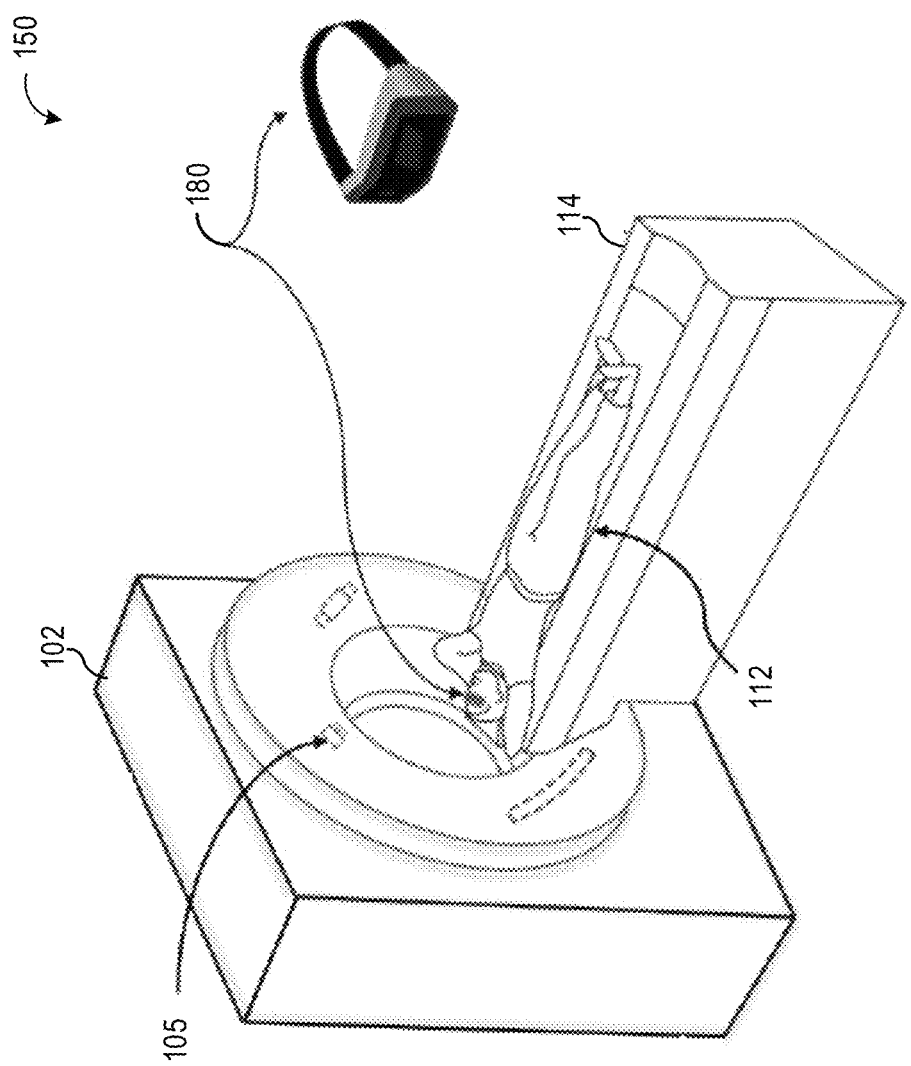
FIG. 1B shows an alternative configuration of the imaging system of FIG. 1A, in accordance with one or more embodiments of the present disclosure.
Figure 1C:
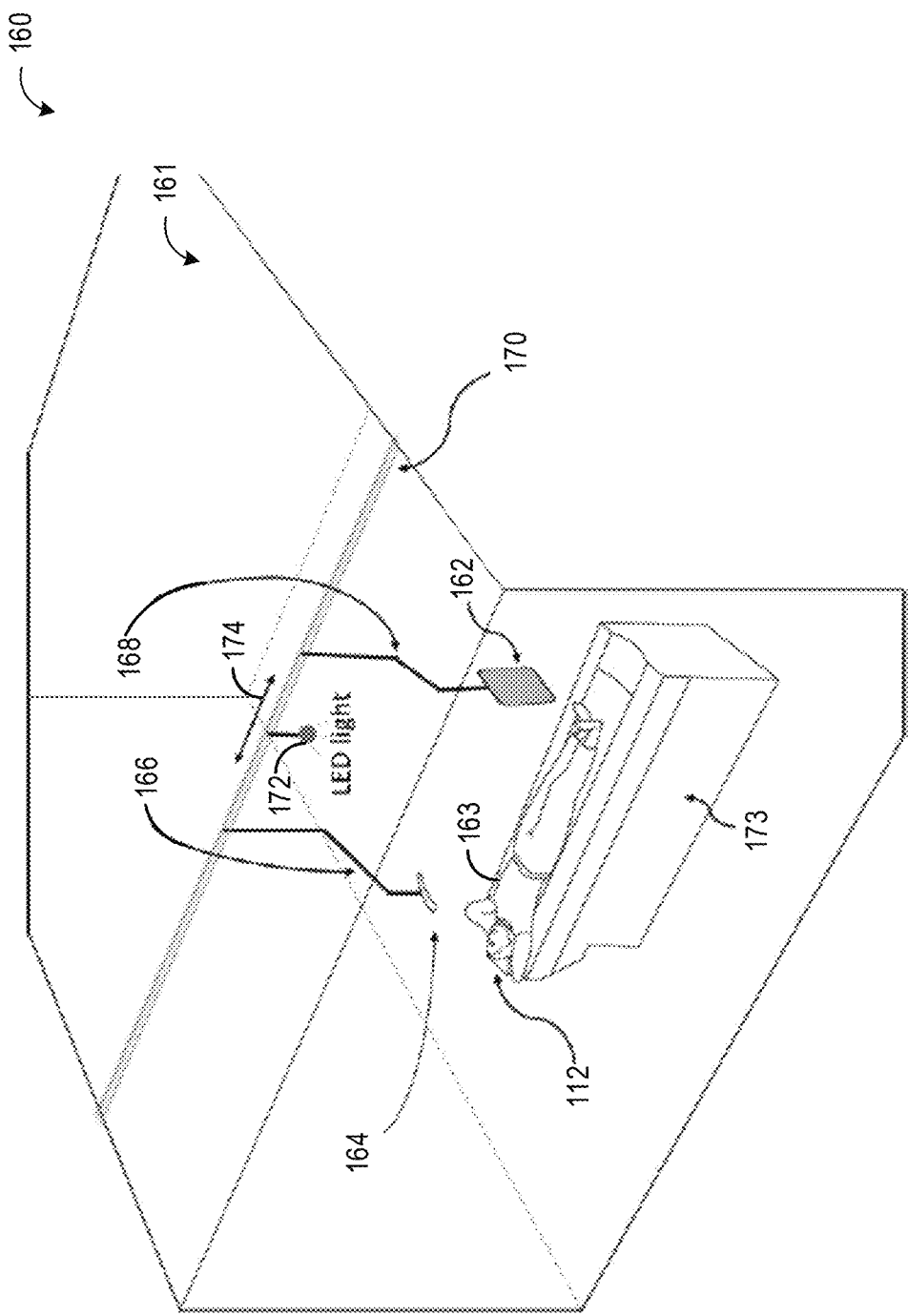
FIG. 1C shows a pictorial view of a coached breathing system, in accordance with one or more embodiments of the present disclosure.
Figure 8A:
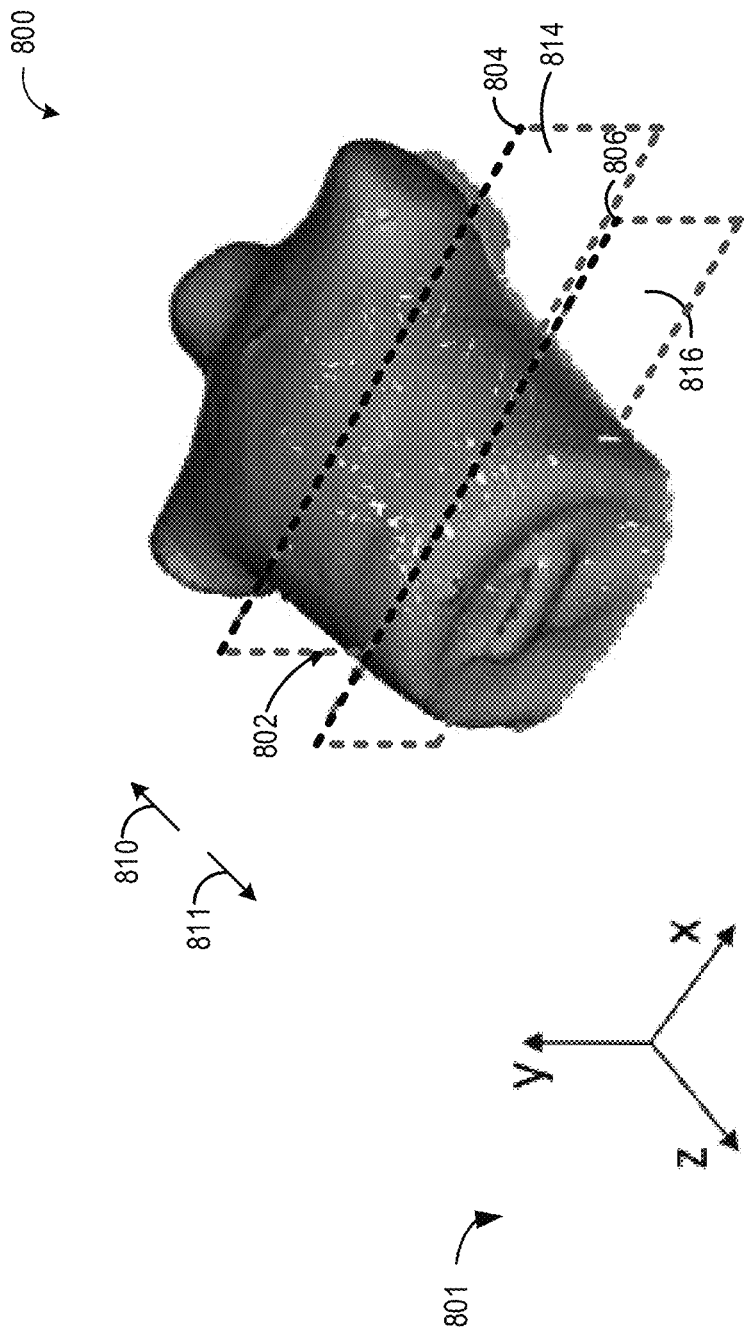
FIG. 8A is a 3-D virtual representation of a chest of a subject of a scan, generated in accordance with one or more embodiments of the present disclosure.
Figure 8B:
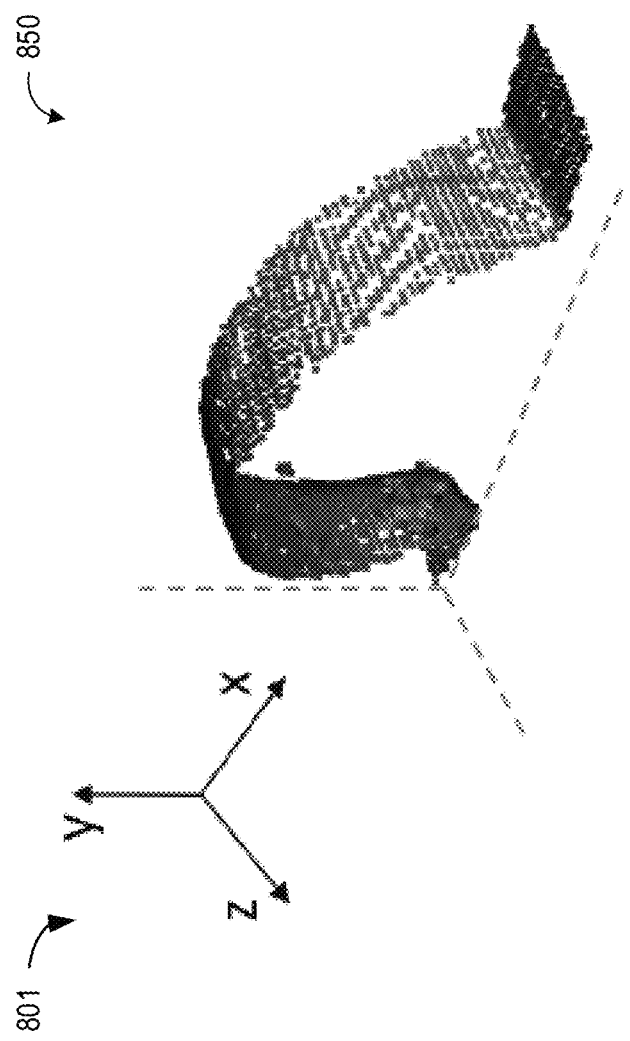
FIG. 8B is a point cloud corresponding to points on the chest of the subject detected using LiDAR, generated in accordance with one or more embodiments of the present disclosure.
Figure 9:
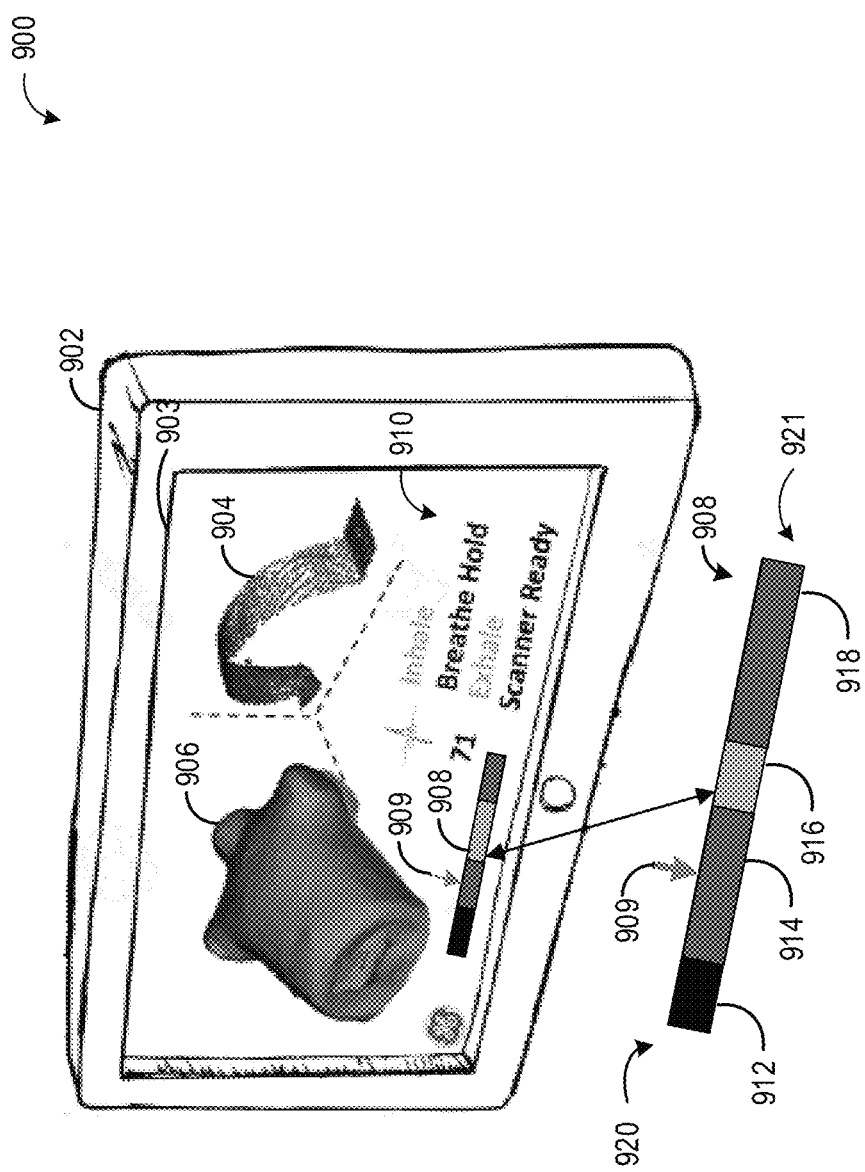
FIG. 9 shows an exemplary display of the 3-D virtual representation of FIG. 8A and the point cloud of FIG. 8B on a display device generated for coached breathing, in accordance with one or more embodiments of the present disclosure.
Figure 10:
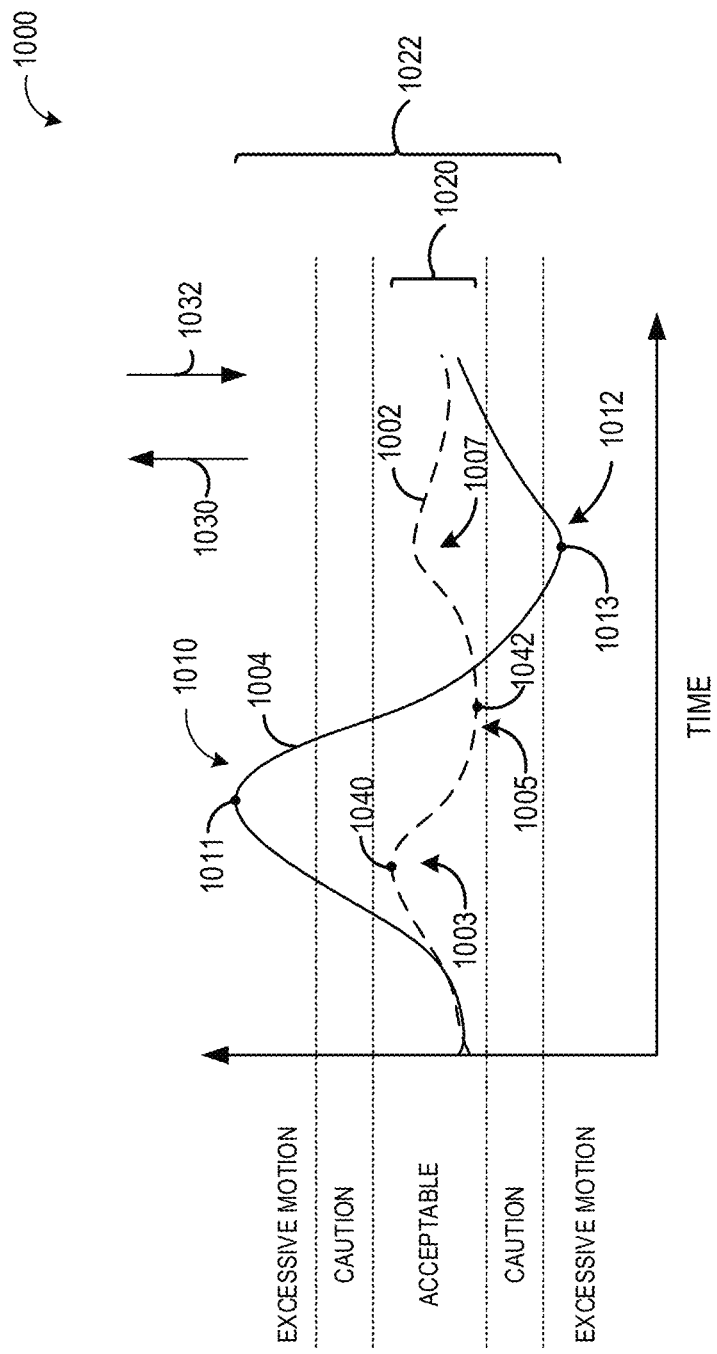
FIG. 10 is a graph showing plots of breathing patterns during coached breathing, in accordance with one or more embodiments of the present disclosure.

Methods and systems are proposed herein for a coached breathing system, which may be integrated into the medical imaging system. An example of a medical imaging system that may be used to perform contrast scans in accordance with the present techniques is provided in FIGS. 1A and 2. The medical imaging system includes a coached breathing apparatus to train a subject of the medical imaging system to minimize movement of the subject during breathing. The coached breathing apparatus may include a monitor coupled to the medical imaging system, as depicted in FIG. 1A. The coached breathing apparatus may include a head-mounted display, as depicted in FIG. 1B. In accordance with a first workflow shown in FIG. 3A, a first version of the coached breathing apparatus may be used to train the subject in a training room, as shown in FIG. 1C, and a second version of the coached breathing apparatus included in the medical imaging system may be used to coach the subject during the scan. In accordance with a second workflow shown in FIG. 3B, the training room may not be used, and the subject may be trained and coached using the second version included in the medical imaging system. The subject may be trained and coached by following a procedure such as the method described in FIG. 4. One or more steps of the method of FIGS. 5A and 5B may be followed to train the subject, which may rely on registering two or more sets of points, referred to herein as point clouds, representing a surface contour of the subject using LiDAR, a 3-D camera, or similar technology, as described in reference to the method of FIG. 6. An example of a point cloud is shown in FIG. 8B, where the point cloud is based on a selected portion of the surface contour, as shown in FIG. 8A. A measured distance between point clouds of the two or more point clouds may be used to determine a target range of motion of a chest of the subject. The target range of motion may be achieved by the subject by following breathing guidance cues and/or a breathing guidance model displayed on a display device, as shown in FIG. 9. FIG. 10 shows example graphs of a first breathing pattern within the target range of motion, and a second breathing pattern outside the target range of motion.

It should further be appreciated that the word "chest", as referenced herein and for the purposes of this disclosure, may include portions of an abdomen of a relevant subject without departing from the scope of this disclosure. Thus, descriptions of a subject's chest should be interpreted as "chest and/or abdomen".

FIG. 1A illustrates an exemplary computed tomography (CT) imaging system 100 configured for CT imaging. It should be appreciated that while the systems and methods disclosed herein are described with respect to a CT imaging system, the disclosed systems and methods may also apply to other types of medical imaging, such as magnetic resonance (MR), positron emission tomography (PET), single photon emission computed tomography (SPECT), nuclear medicine (NM) imaging, and/or others without departing from the scope of this disclosure.

Particularly, the CT imaging system 100 is configured to image a subject 112 such as a patient, an inanimate object, one or more manufactured parts, and/or foreign objects such as dental implants, stents, and/or contrast agents present within the body. In one embodiment, the CT imaging system 100 includes a gantry 102, which in turn, may further include at least one X-ray source 104 configured to project a beam of X-ray radiation 106 (see FIG. 2) for use in imaging the subject 112 laying on a table 114. Specifically, the X-ray source 104 is configured to project the X-ray radiation beams 106 towards a detector array 108 positioned on the opposite side of the gantry 102. Although FIG. 1A depicts a single X-ray source 104, in certain embodiments, multiple X-ray sources and detectors may be employed to project a plurality of X-ray radiation beams for acquiring projection data at different energy levels corresponding to the patient. In some embodiments, the X-ray source 104 may enable dual-energy gemstone spectral imaging (GSI) by rapid peak kilovoltage (kVp) switching. In some embodiments, the X-ray detector employed is a photon-counting detector which is capable of differentiating X-ray photons of different energies. In other embodiments, two sets of X-ray sources and detectors are used to generate dual-energy projections, with one set at low-kVp and the other at high-kVp. It should thus be appreciated that the methods described herein may be implemented with single energy acquisition techniques as well as dual energy acquisition techniques.

In certain embodiments, the CT imaging system 100 further includes an image processor unit 110 configured to reconstruct images of a target volume of the subject 112 using an iterative or analytic image reconstruction method. For example, the image processor unit 110 may use an analytic image reconstruction approach such as filtered back projection (FBP) to reconstruct images of a target volume of the patient. As another example, the image processor unit 110 may use an iterative image reconstruction approach such as advanced statistical iterative reconstruction (ASIR), conjugate gradient (CG), maximum likelihood expectation maximization (MLEM), model-based iterative reconstruction (MBIR), and so on to reconstruct images of a target volume of the subject 112. As described further herein, in some examples the image processor unit 110 may use both an analytic image reconstruction approach such as FBP in addition to an iterative image reconstruction approach.

In some CT imaging system configurations, an X-ray source projects a cone-shaped X-ray radiation beam which is collimated to lie within an X-Y-Z plane of a Cartesian coordinate system and generally referred to as an "imaging plane." The X-ray radiation beam passes through an object being imaged, such as the patient or subject. The X-ray radiation beam, after being attenuated by the object, impinges upon an array of detector elements. The intensity of the attenuated X-ray radiation beam received at the detector array is dependent upon the attenuation of an X-ray radiation beam by the object. Each detector element of the array produces a separate electrical signal that is a measurement of the X-ray beam attenuation at the detector location. The attenuation measurements from all the detector elements are acquired separately to produce a transmission profile.

In some medical imaging systems, the X-ray source and the detector array are rotated with a gantry within the imaging plane and around the object to be imaged such that an angle at which the X-ray beam intersects the object constantly changes. A group of X-ray radiation attenuation measurements, e.g., projection data, from the detector array at one gantry angle is referred to as a "view." A "scan" of the object includes a set of views made at different gantry angles, or view angles, during one revolution of the X-ray source and detector.

As described in greater detail herein, CT imaging system 100 may be configured to train subject 112 to reduce a movement of subject 112 during a scan. For example, CT imaging system 100 may be configured to train subject 112 to breathe in a manner that minimizes a movement of breathing areas of subject 112 (e.g., coached breathing) during the scan. For example, a scan may be performed on an abdomen of subject 112, and a movement of the abdomen due to breathing may decrease a quality of an image reconstructed from data acquired during the scan.

As such, CT imaging system 100 includes a coached breathing system. Some components of coached breathing system may be integrated into CT imaging system 100, and other components of the coached breathing system may be separate from CT imaging system 100. For example, some components of the coached breathing system may be integrated into gantry 102, or image processing unit 110, or a different component of CT imaging system 100. Further, and some embodiments, a first version of the coached breathing system may be integrated into CT imaging system 100, and a second version of the coached breathing system may be separate from CT imaging system 100. For example, the second version of the coached breathing system may be used to train subject 112 to control their breathing at a different location than the CT imaging system 100 (e.g., a training room, such as the training room depicted in FIG. 1C), and the first version of the coached breathing system may be used by subject 112 to control their breathing during a scan performed using CT imaging system 100.

The coached breathing system includes a secondary imaging device 105, and a patient display device 130. In the depicted embodiment, secondary imaging device 105 is positioned inside gantry 102. In other embodiments, secondary imaging device 105 may be coupled to an exterior surface of gantry 102. In one embodiment, secondary imaging device 105 is a Laser Imaging Detection and Ranging (LiDAR) system. In another embodiment, secondary imaging device 105 may be a 3-D camera, or a different type of remote sensing device.

Secondary imaging device 105 may capture a surface contour of portions of a body subject 112, such as, for example, a chest of subject 112. The surface contour may be used to generate a visualization of the portions of the body, which may be displayed on patient display device 130. The visualization may be used to train subject 112 to maintain a still position and minimize a movement of the portions of the body during a scan. For example, the visualization may be used to train subject 112 to control their breathing to reduce a movement of their chest. Generation of the visualization is described in greater detail below in reference to FIGS. 4-9.

Patient display device 130 may be coupled to gantry 102 via a movable arm 132. Patient display device 130 may be coupled to an end of moveable arm 132 in a manner such that display device may be flexibly rotated in at least a first plane of movement indicated by a circular arrow 134. For example patient display device 130 may be coupled to the end of moveable arm 132 via a hinge. In some embodiments, patient display device 130 may be coupled to the end of moveable arm 132 via a ball-and-socket joint or similar type of coupling that allows patient display device 130 to be flexibly rotated in additional planes of movement. A coupling of patient display device 130 with moveable arm 132 may allow a screen of patient display device 130 to be directed towards subject 112, such that subject 112 may view the visualization displayed on patient display device 130 when lying on table 114 with minimal adjustment of a position of subject 112 on table 114.

Moveable arm 132 may be coupled to gantry 102 in a manner that allows movable arm 132 to rotate in a direction indicated by an arrow 136. For example, movable arm 132 may be rotated from a first position 140, in the direction indicated by arrow 136, to a second position 141. First position 140 may be a position at which patient display device 130 is most easily visible to subject 112 during a scan. Second position 141 may be a position at which patient display device 130 is not visible to subject 112 during a scan. For example, position 141 may be a position at which patient display device 130 is not a distraction to subject 112, and/or does not interfere with CT imaging system 100, subject 112, and/or an operator of CT imaging system 100 in another manner. In some embodiments, movable arm 132 may be rotated beyond second position 141, and direction indicated by an arrow 138. For example, in some embodiments, movable arm 132 may be rotated 180° or more from first position 140.

In other embodiments, display device 130 may not be coupled to CT imaging system 100. For example, display device 130 may be positioned on a cart, or maybe included on a chassis of a movable device or system that may be positioned at a suitable location next to table 114 and subject 112. Further, in some embodiments, CT imaging system 100 may not include display device 130. For example, in some embodiments, feedback may be provided to subject 112 with respect to performing the coached breathing via one or more lighted portions of and/or lights positioned at an inner surface 120 of gantry 102, an edge 121 of gantry 102, or a front surface 122 of gantry 102.

For example, FIG. 1B shows an alternative configuration 150 of CT imaging system 100 where the coached breathing system includes a head-mounted display 180, and the visualization is displayed on head-mounted display 180 rather than on patient display device 130. An advantage of displaying the visualization on head-mounted display 180 rather than patient display device 130, is that subject 112 may be able to view the visualization with a head of subject 112 in various positions (e.g., without having to angle the head or turn a neck of subject 112 to view the visualization). Additionally, subject 112 may be able to view the visualization on head-mounted display 180 at various positions of table 114, including table positions where the head of subject 112 may be within gantry 102 and display device 130 may not be viewable by subject 112.

FIG. 1C shows a second version 160 of the coached breathing system, where second version 160 is installed in a coached breathing training room 161. Coached breathing training room 161 includes a bed or table 173 on which subject 112 may be positioned during training on the coached breathing system, which may be substantially similar to table 114 of FIG. 1A. Subject 112 may be positioned on bed 180 in a position that is substantially similar to a position of subject 112 adopted for a scan using CT imaging system 100. Alternatively, subject 112 may adopt a different position than depicted in FIG. 1C. For example, subject 112 may be a pediatric patient, and the pediatric patient may be positioned in a different type of bed or chair.

In the depicted embodiment, a secondary imaging device 164 may be positioned above and/or proximal to a chest 163 of subject 112, and a display device 162 may be positioned at a location and orientation such that subject 112 may view a screen of display device 162 during training on the coached breathing system. Secondary imaging device 164 and display device 162 may be the same as or similar to secondary imaging device 105 and display device 130 of CT imaging system 100. In one embodiment, secondary imaging device 164 and display device 162 are flexibly coupled to a rail 170 via a first moveable arm 166 and a second moveable arm 168, respectively, such that a first position of secondary imaging device 164 and a second position of display device 162 along rail 170 may be adjusted to accommodate various subjects of different sizes. For example, first moveable arm 166 and second moveable arm 168 may be slidably coupled to rail 170 such that first moveable arm 166 and second moveable arm 168 may independently slide along rail 170 in either of two directions indicated by an arrow 174.

In some embodiments, second version 160 of the coached breathing system may include an LED light 172, which may be configured to indicate to subject 112, during training on the coached breathing system, whether a movement of chest 163 of subject 112 due to breathing is within a desired range of motion. The desired range of motion may be based on a breathing pattern, which may be defined by a range of motion of chest 163, a rate of breathing of subject 112, and/or an ability of subject 112 to hold their breath as instructed. For example, if subject 112 is breathing at a first, rapid or heavy rate, the movement of chest 163 may not be within the desired range of motion. As a result of the movement of chest 163 not being within the desired range of motion, LED light 172 may be switched on. If subject 112 is breathing at a second, slow and shallow rate, the movement of chest 163 may be within the desired range of motion, and LED light 172 may be switched off. In other words, a difference in a position of a surface of chest 163 with respect to secondary imaging device 164 between an exhalation of subject 112 and an inhalation of subject 112 may be measured by the coached breathing system, and LED light 172 may be switched on or off based on whether the difference exceeds a threshold difference. LED light 172 may indicate to subject 112 when the movement of chest 163 is within the desired range of motion and when the movement of chest 163 is outside the desired range of motion. For example, in one embodiment, LED light 172 may be illuminated as a green light when the movement of chest 163 is within the desired range of motion, and LED light 172 may be illuminated as a red light when the movement of chest 163 is outside the desired range of motion. Thus, by monitoring LED light 172, subject 112 may be trained to adjust the breathing to maintain the movement of chest 163 within the desired range of motion.

Instructions for performing the coached breathing and following one or more breathing patterns may be displayed on display device 162. The instructions may include written instructions, or audio instructions, or both written and audio instructions. Additionally, as described in greater detail below, a visualization of the breathing of the subject may be displayed on display device 162, where the visualization may aid the subject in performing the coached breathing. Specifically, a first visualization of the subject's breathing may be displayed along with a second visualization of a selected breathing pattern, such that the subject may adopt the selected breathing pattern by aligning the first visualization with the second visualization.

In various embodiments, subject 112 may be trained in coached breathing training room 161 prior to a scan being performed on subject 112. After subject 112 has been trained to control their breathing sufficiently to maintain the movement of chest 163 within the desired range of motion, the scan may be performed on subject 112. During the scan, subject 112 may use a version of the coached breathing system integrated into CT imaging system 100 to monitor their breathing, as described above in reference to FIG. 1A.

Figure 2:
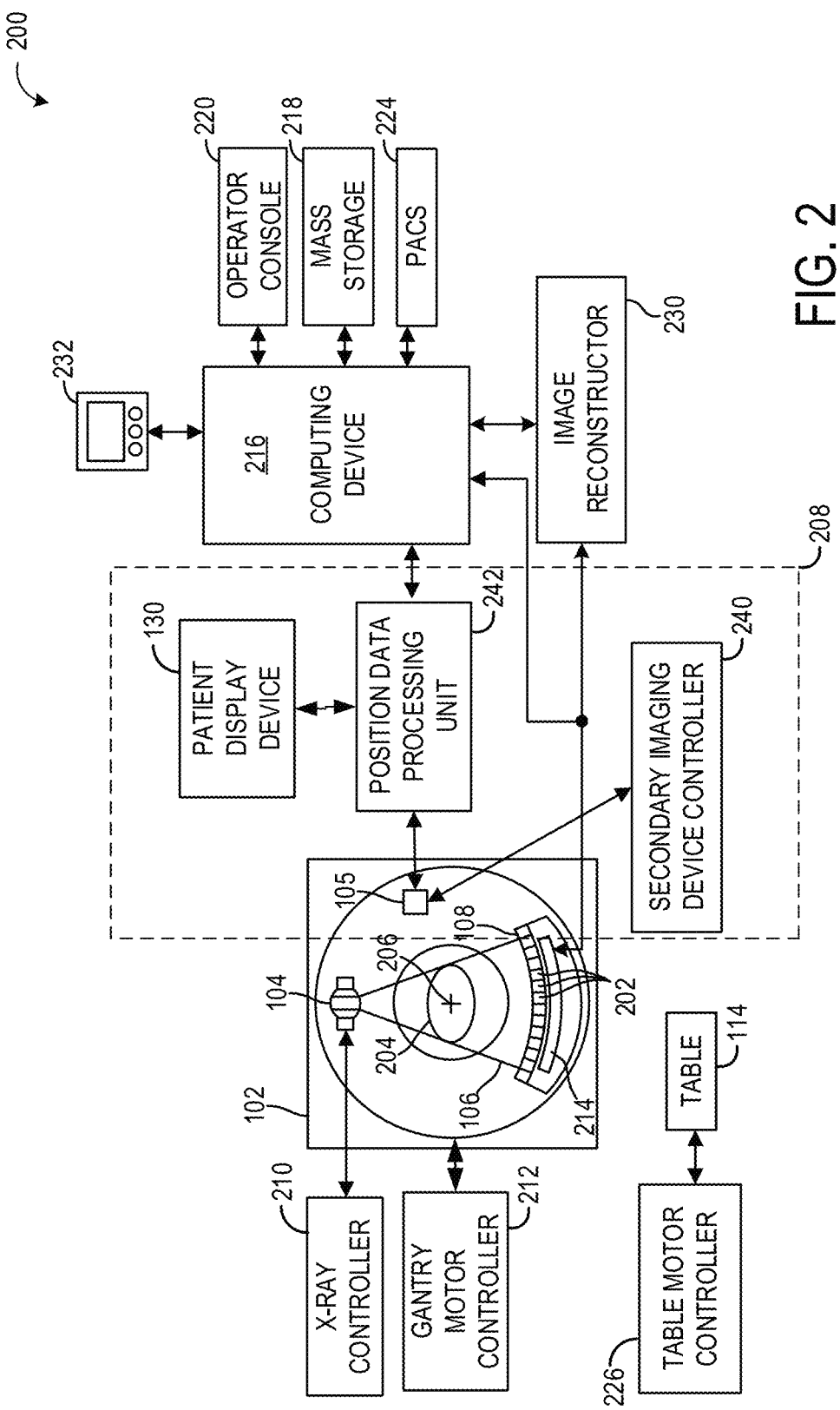
FIG. 2 shows a block schematic diagram of an exemplary imaging system, in accordance with one or more embodiments of the present disclosure.

FIG. 2 illustrates an exemplary CT imaging system 200, which may be the same as or similar to the CT imaging system 100 of FIG. 1A. In accordance with aspects of the present disclosure, CT imaging system 200 is configured for imaging a subject 204 (e.g., the subject 112 of FIG. 1A). In one embodiment, the CT imaging system 200 includes the detector array 108 (see FIG. 1A). The detector array 108 further includes a plurality of detector elements 202 that together sense the X-ray radiation beam 106 (see FIG. 2) that pass through the subject 204 (such as a patient) to acquire corresponding projection data. In some embodiments, the detector array 108 may be fabricated in a multi-slice configuration including the plurality of rows of cells or detector elements 202, where one or more additional rows of the detector elements 202 are arranged in a parallel configuration for acquiring the projection data.

In certain embodiments, the CT imaging system 200 is configured to traverse different angular positions around the subject 204 for acquiring desired projection data. Accordingly, the gantry 102 and the components mounted thereon may be configured to rotate about a center of rotation 206 for acquiring the projection data, for example, at different energy levels. Alternatively, in embodiments where a projection angle relative to the subject 204 varies as a function of time, the mounted components may be configured to move along a general curve rather than along a segment of a circle.

As the X-ray source 104 and the detector array 108 rotate, the detector array 108 collects data of the attenuated X-ray beams. The data collected by the detector array 108 undergoes pre-processing and calibration to condition the data to represent the line integrals of the attenuation coefficients of the scanned subject 204. The processed data are commonly called projections. In some examples, the individual detectors or detector elements 202 of the detector array 108 may include photon-counting detectors which register the interactions of individual photons into one or more energy bins. It should be appreciated that the methods described herein may also be implemented with energy-integrating detectors.

The acquired sets of projection data may be used for basis material decomposition (BMD). During BMD, the measured projections are converted to a set of material-density projections. The material-density projections may be reconstructed to form a pair or a set of material-density map or image of each respective basis material, such as bone, soft tissue, and/or contrast agent maps. The density maps or images may be, in turn, associated to form a 3-D volumetric image of the basis material, for example, bone, soft tissue, and/or contrast agent, in the imaged volume.

Once reconstructed, the basis material image produced by the CT imaging system 200 reveals internal features of the subject 204, expressed in the densities of two basis materials. The density image may be displayed to show these features. In traditional approaches to diagnosis of medical conditions, such as disease states, and more generally of medical events, a radiologist or physician would consider a hard copy or display of the density image to discern characteristic features of interest. Such features might include lesions, sizes and shapes of particular anatomies or organs, and other features that would be discernable in the image based upon the skill and knowledge of the individual practitioner.

In one embodiment, the CT imaging system 200 includes control mechanisms to control movement of components, such as rotation of the gantry 102 and the operation of the X-ray source 104. In certain embodiments, the CT imaging system 200 includes an X-ray controller 210 configured to provide power and timing signals to the X-ray source 104. Additionally, the CT imaging system 200 includes a gantry motor controller 212 configured to control a rotational speed and/or position of the gantry 102 based on imaging requirements.

In certain embodiments, the CT imaging system 200 further includes a data acquisition system (DAS) 214 configured to sample analog data received from the detector elements 202 and convert the analog data to digital signals for subsequent processing. The DAS 214 may be further configured to selectively aggregate analog data from a subset of the detector elements 202 into so-called macro-detectors, as described further herein. The data sampled and digitized by the DAS 214 is transmitted to a computer or computing device 216. In one example, the computing device 216 stores the data in a storage device or mass storage 218. The storage device 218, for example, may be any type of non-transitory memory and may include a hard disk drive, a floppy disk drive, a compact disk-read/write (CD-R/W) drive, a Digital Versatile Disc (DVD) drive, a flash drive, and/or a solid-state storage drive.

Additionally, the computing device 216 provides commands and parameters to one or more of the DAS 214, the X-ray controller 210, and the gantry motor controller 212 for controlling system operations such as data acquisition and/or processing. In certain embodiments, the computing device 216 controls system operations based on operator input. The computing device 216 receives the operator input, for example, including commands and/or scanning parameters via an operator console 220 operatively coupled to the computing device 216. The operator console 220 may include a keyboard (not shown) or a touchscreen to allow the operator to specify the commands and/or scanning parameters.

Although FIG. 2 illustrates one operator console 220, more than one operator console may be coupled to the CT imaging system 200, for example, for inputting or outputting system parameters, requesting examinations, plotting data, and/or viewing images. Further, in certain embodiments, the CT imaging system 200 may be coupled to multiple displays, printers, workstations, and/or similar devices located either locally or remotely, for example, within an institution or hospital, or in an entirely different location via one or more configurable wired and/or wireless networks such as the Internet and/or virtual private networks, wireless telephone networks, wireless local area networks, wired local area networks, wireless wide area networks, wired wide area networks, etc.

In one embodiment, for example, the CT imaging system 200 either includes, or is coupled to, a picture archiving and communications system (PACS) 224. In an exemplary implementation, the PACS 224 is further coupled to a remote system such as a radiology department information system, hospital information system, and/or to an internal or external network (not shown) to allow operators at different locations to supply commands and parameters and/or gain access to the image data.

The computing device 216 uses the operator-supplied and/or system-defined commands and parameters to operate a table motor controller 226, which in turn, may control a table 114 which may be a motorized table. Specifically, the table motor controller 226 may move the table 114 for appropriately positioning the subject 204 in the gantry 102 for acquiring projection data corresponding to the target volume of the subject 204.

As previously noted, the DAS 214 samples and digitizes the projection data acquired by the detector elements 202. Subsequently, an image reconstructor 230 uses the sampled and digitized X-ray data to perform high-speed reconstruction. Although FIG. 2 illustrates the image reconstructor 230 as a separate entity, in certain embodiments, the image reconstructor 230 may form part of the computing device 216. Alternatively, the image reconstructor 230 may be absent from the CT imaging system 200 and instead the computing device 216 may perform one or more functions of the image reconstructor 230. Moreover, the image reconstructor 230 may be located locally or remotely, and may be operatively connected to the CT imaging system 200 using a wired or wireless network. Particularly, one exemplary embodiment may use computing resources in a "cloud" network cluster for the image reconstructor 230.

In one embodiment, the image reconstructor 230 stores the images reconstructed in the storage device 218. Alternatively, the image reconstructor 230 may transmit the reconstructed images to the computing device 216 for generating useful patient information for diagnosis and evaluation. In certain embodiments, the computing device 216 may transmit the reconstructed images and/or the patient information to a display or display device 232 communicatively coupled to the computing device 216 and/or the image reconstructor 230. In some embodiments, the reconstructed images may be transmitted from the computing device 216 or the image reconstructor 230 to the storage device 218 for short-term or long-term storage.

CT imaging system 200 includes a coached breathing system 208, which may be a non-limiting example of the coached breathing system described above in reference to FIGS. 1A, 1B, and 1C. In addition to secondary imaging device 105 and patient display device 130, coached breathing system 208 includes a secondary imaging device controller 240 and a position data processing unit 242. Secondary imaging device controller 240 may be configured to control secondary imaging device 105. In various embodiments, secondary imaging device 105 may cover a 360 degree view of portions of subject 112 within gantry 102. In some embodiments, a plurality of secondary imaging devices 105 may be arranged at different positions around gantry 102, such that the 360 degree view of the portions of subject 112 within gantry 102 are covered by the plurality of secondary imaging devices 105.

Position data processing unit 242 may be coupled to secondary imaging device 105. Position data processing unit 242 may receive image data from secondary imaging device 105, and process the image data to determine whether a range of motion of one or more breathing areas of a subject of a scan (e.g., a chest, abdomen, etc. of subject 112) exceeds a threshold range of motion during an inhalation and exhalation of the subject. If the range of motion exceeds the threshold range of motion, the subject may be coached to adjust their breathing to reduce a movement of the one or more breathing areas of the subject using a visualization displayed on patient display device 130, as described above. Processing of the image data by position data processing unit 242 is described in greater detail below, in reference to FIGS. 4-7.

Figure 3A:
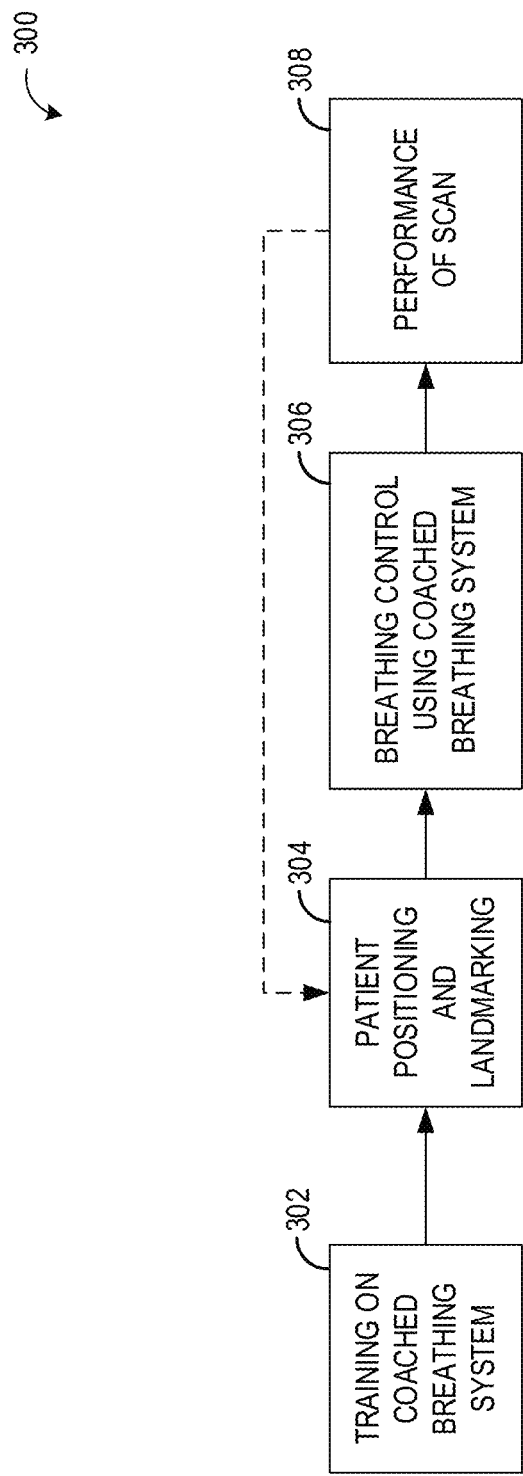
FIG. 3A shows a block schematic diagram of a first workflow for performing a scan with coached breathing, in accordance with one or more embodiments of the present disclosure.

FIG. 3A shows a first workflow 300 with respect to how a coached breathing system such as coached breathing system 208 of FIG. 2 might operate. In first workflow 300, at a first block 302, a subject of a medical imaging system (e.g., subject 112 of CT imaging system 100) may be trained using the coached breathing system prior to performing a scan. During training, the subject may view an interactive visualization of a portion of a chest of the subject on a display screen, such as on a screen of the display device 162 described above in reference to FIG. 1C, or on a head-mounted display, such as head-mounted display 180 described above in reference to FIG. 1B. As described in greater detail below, the interactive visualization may include a 3-D virtual representation of a surface of the chest while the subject breathes. As the subject breathes, the interactive visualization may change to show the subject a motion of the chest during the breathing. For example, the 3-D virtual representation may expand during an inhalation of the subject, and may contract during and exhalation of the subject.

The subject may change a breathing pattern, or a manner in which they breathe, and the change may be shown via the 3-D virtual representation. The interactive visualization may indicate a target or reference position of the 3-D virtual representation, and/or may indicate a desired (e.g. threshold) range of motion (e.g., expansion and contraction) of the chest. Thus, by viewing their breathing in the interactive visualization along with the target or reference position, the subject may adjust their breathing to match the target or reference position. Matching the target or reference position may include not allowing the chest to expand beyond a first threshold distance from the target position, and/or not allowing the chest to contract beyond a second threshold distance from the target position. In this way, the subject may learn to breathe in a manner that minimizes a movement of breathing areas of the subjects body, thereby producing a potential for noise and increasing a quality of an image reconstructed from the scan.

As an example, the subject may experience anxiety in anticipation of the CT exam. As a result of the anxiety, the subject may be breathing in an irregular, heavy, deep, or rapid manner. Because performing the scan on the subject while the subject is breathing in the regular, heavy, deep, rapid manner may introduce noise artifacts in an image resulting from the scan due to an excessive motion of the chest of the subject, the subject may be trained to control their breathing using the coached breathing system. A 3-D camera, LiDAR laser, or similar remote sensing technology may be positioned above the chest of the subject, which may capture a surface contour of the chest. The surface contour may be displayed on a display device via an interactive visualization that allows the subject to view the movement of their chest during breathing.

Viewing the interactive visualization may aid the subject in controlling their breathing. For example, the subject may view a 3-D virtual representation of their chest expanding during an inhalation. The interactive visualization may indicate that the expansion of the chest exceeds a desired (e.g., threshold) expansion. For example a visual component of the interactive visualization may be illuminated, or highlighted, to indicate the excessive expansion. Additionally or alternatively, an LED light (LED light 172 of FIG. 1C) on or near the display may be illuminated to indicate the excessive expansion. As a result of viewing the excessive expansion, the subject may attempt to restrain their inhalation to reduce the movement of the chest.

In various embodiments, the training on the coached breathing system may be performed in a different location from the medical imaging system. For example, the training on the coached breathing system may be performed in a coached breathing training room, such as coached breathing training room 161 of FIG. 1C. An advantage of training the subject in a coached breathing training room rather than on the medical imaging system is that a level of anxiety of the subject due to an anticipation of the scan may be reduced. Additionally, an amount of time available to the subject for training in the coached breathing training room may be greater than an amount of time available for training on the medical imaging system, due to a greater use of the medical imaging system.

Once the subject has been trained, at a second block 304 of first workflow 300, the subject may be positioned on a table of the medical imaging system (e.g., table 114) in a suitable position for performing the scan. For example, if a heart, or abdomen of the subject is being scanned, the subject may be positioned lying down face up on the table. The subject may be landmarked to aid an operator in aligning an x-ray source of the medical imaging system (e.g., x-ray source 104) on an anatomical region of interest (ROI) of the subject. Positioning the subject on the table may include adjusting a position of the table to insert a portion of a body of the subject including the ROI within the imaging plane of the gantry.

Once the subject has been positioned in the suitable position for performing the scan, at a third block 306 of first workflow 300, the subject may practice and/or be instructed on coached breathing using the coached breathing system. For example, the subject may view a version of the interactive visualization described above on a display device coupled to the medical imaging system (e.g., patient display device 130 of FIG. 1A). Alternatively, for example, if the subject is positioned within the gantry of the medical imaging system such that the display device is not visible to the subject, the interactive visualization may be displayed on the head-mounted display. The subject may practice coached breathing with the aid of the visualization until the movement of the chest of the subject is within the threshold range of motion defined by the target or reference position.

When the movement of the chest of the subject is within the threshold range of motion, at a fourth block 308 of first workflow 300, the scan may be performed. In various embodiments, the subject may continue practicing the coached breathing during performance of the scan, to ensure minimal movement of the subject's body.

Figure 3B:
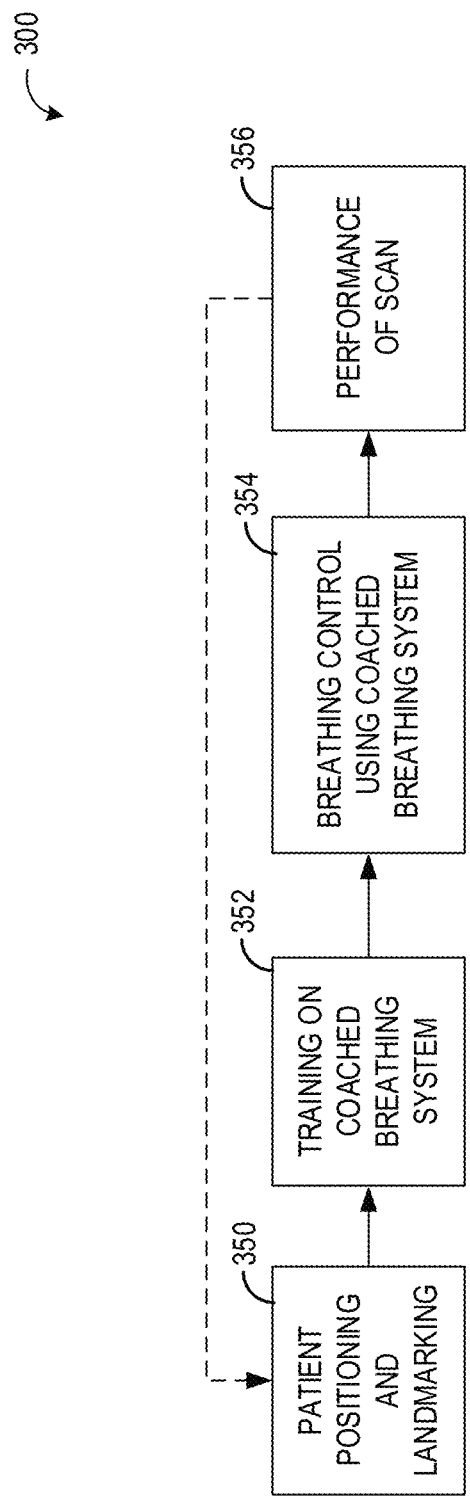
FIG. 3B shows a block schematic diagram of a second, alternative workflow for performing a scan with coached breathing, in accordance with one or more embodiments of the present disclosure.

FIG. 3B shows a second workflow 350 with respect to how the coached breathing system might operate. In second workflow 350, the subject may not be trained prior to being positioned on the table of the medical imaging system. For example, the coached breathing training room may not be available for training the subject, or an operator of the medical imaging system may determine that a suggested amount of time for training the subject may be too short to justify using the coached breathing training room, or for a different reason. Thus, in accordance with second workflow 350, at a first block 302, the subject is positioned on the table of the medical imaging system and landmarked; at a second block 352, the subject may be trained on the coached breathing system as described above while positioned on the table of the medical imaging system; at a third block 354, the subject may practice the coached breathing in preparation for the scan; and at a fourth block 356, the scan may be performed, while the subject is performing the coached breathing.

Figure 4:
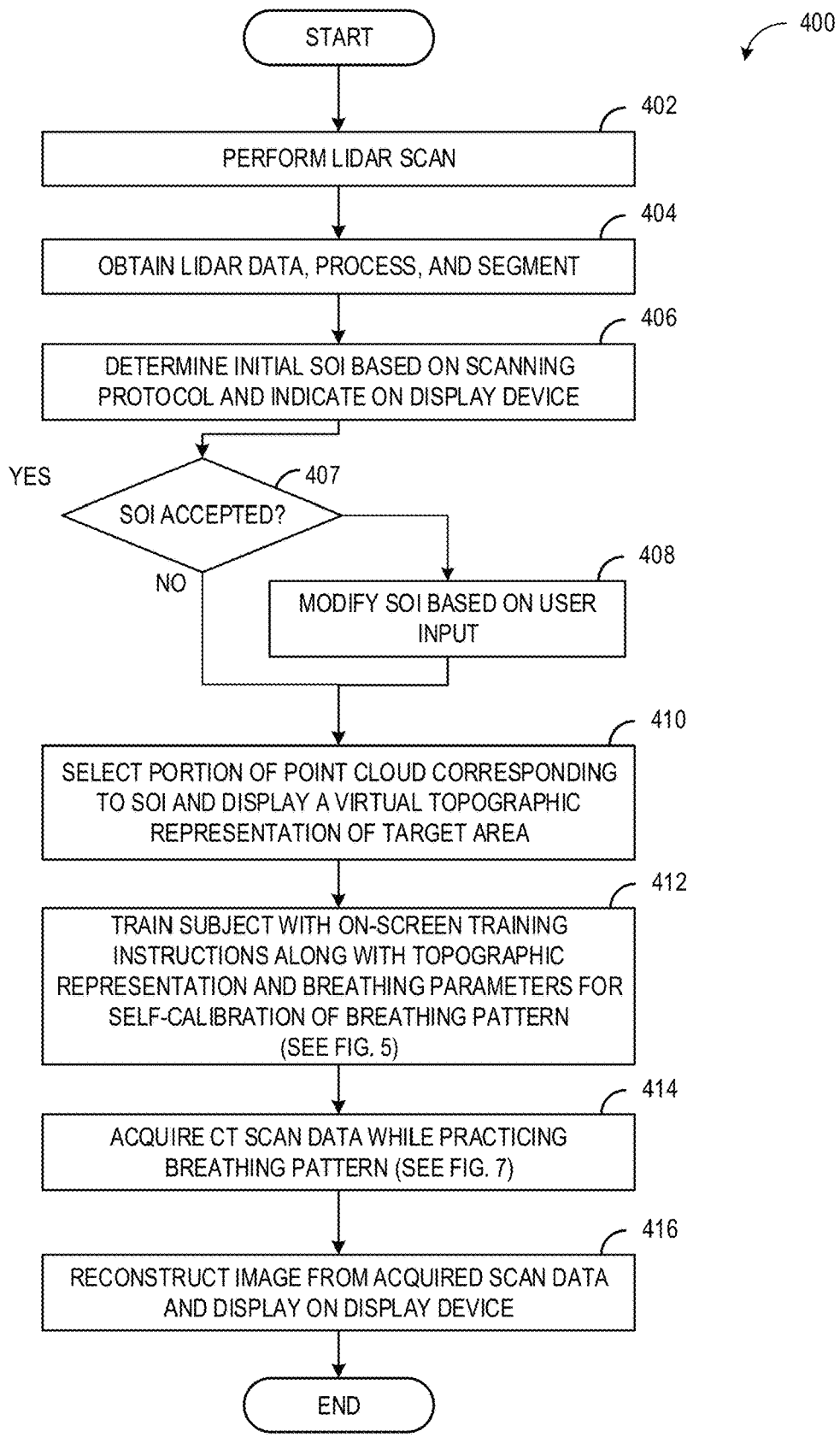
FIG. 4 is a flowchart illustrating an exemplary high-level method for performing a scan with coached breathing, in accordance with one or more embodiments of the present disclosure.

FIG. 4 shows an exemplary method 400 for generating and displaying the interactive visualization described above, based on data generated by a secondary imaging device (e.g., secondary imaging device 105 of FIG. 1A) of a medical imaging system including a coached breathing system, such as coached breathing system 208 of FIG. 2. In the embodiment described in method 400, the secondary imaging device is a LiDAR source/transmitter (e.g., a laser). However, it should be appreciated that in other embodiments a different remote sensing technology may be used. For example, a 3-D camera may be used. The medical imaging system may be a non-limiting example of CT imaging system 100 of FIG. 1A and/or medical CT imaging system 200 of FIG. 2, or the medical imaging system may be a different type of imaging system including a gantry, table, and other components described herein. Method 400 and the other methods included herein may be executed by a processor of the medical imaging system, based on instructions stored in a memory of the medical imaging system. For example, a processor and the memory may be included in a processing unit of the medical imaging system, such as position data processing unit 242 of FIG. 2.

Method 400 begins at 402, where the method includes performing a scan of the subject using the LiDAR source. During the scan, the LiDAR source transmits laser light towards the subject. The laser light reflects off a surface of the subject's body and surrounding portions of a table or bed on which the subject is positioned, and is detected at a receiver. A time of flight (TOF) of the reflected light is measured, and used to determine distances between the LiDAR source and a plurality of points on the surface of the subject's body. The distance measurements are used to create a 3-D virtual representation of a surface contour of the body, based on the plurality of points.

At 404, method 400 includes obtaining, processing, and segmenting the LiDAR data. The points on the surface contour are generated as a set of points in three dimensions, referred to herein as a point cloud. However, the point cloud may include portions of the table or bed detectable by the LiDAR source. To distinguish between points of the point cloud representing the surface contour of the subject's body from points of the point cloud representing one or more surfaces of the table or bed (or other components of or positioned in the medical imaging system), a segmentation process may be performed. The segmentation process may use various techniques and methods known in the art. In one embodiment, density-based spatial clustering of applications with noise (DBSCAN) is used to segment the obtained LiDAR data.

At 406, method 400 includes determining an initial surface of interest (SOI) of the segmented 3-D region, and indicating the SOI on the segmented 3-D region on a display device of the coached breathing system (e.g., patient display device 130 of FIG. 1A or display device 162 of FIG. 1C). In some embodiments, the SOI may alternatively be indicated on a display device of the medical imaging system (e.g., display device 232 of FIG. 2). The initial SOI may be selected based on a scanning protocol selected for a scan of the subject using the medical imaging system. For example, the scanning protocol may indicate that an ROI of the scan is located in an abdomen of the subject. As a result of the scanning protocol indicating that the ROI is located in the abdomen, the SOI may be indicated on the segmented 3-D region via visual indicators such as indicator lines defining the initial SOI that are superimposed on the segmented 3-D region.

Referring to FIG. 8A, a segmented 3-D point cloud 800 of a surface of a subject's chest is shown, where segmented 3-D point cloud 800 may be generated from a LiDAR source as described in reference to FIG. 4 and displayed on the display screen. A SOI 802 is indicated on segmented 3-D point cloud 800 by a first indicator line 804 and a second indicator line 806, where SOI 802 includes points of segmented 3-D point cloud 800 located between first indicator line 804 and a second indicator line 806. Specifically, SOI 802 may be defined as points of segmented 3-D point cloud 800 located between a first boundary plane 814 in the y dimension (as depicted on reference coordinate axes 801) defined by first indicator line 804, and a second boundary plane 816 in the y dimension defined by second indicator line 806.

A size (e.g., surface area) and/or location of SOI 802 on segmented 3-D point cloud 800 may be adjusted by adjusting a position of one or both of first indicator line 804 and second indicator line 806 (and the corresponding boundary planes 814 and 816) on segmented 3-D point cloud 800 in a first direction 810, or a second direction 811. For example, the size of SOI 802 may be increased by adjusting the position of first indicator line 804 in first direction 810, and adjusting the position of second indicator line 806 in second direction 811, or the size of SOI 802 may be decreased by adjusting the position of first indicator line 804 in second direction 811, and adjusting the position of second indicator line 806 in first direction 810. Additionally or alternatively, a relative position of SOI 802 on segmented 3-D point cloud 800 may be adjusted by adjusting both of the position of first indicator line 804 and the position of second indicator line 806 in first direction 810, or adjusting both of the position of first indicator line 804 and the position of second indicator line 806 in second direction 811. By adjusting the position of first indicator line 804 and the position of second indicator line 806, a user of the coached breathing system (e.g., an operator of the medical imaging system or a technician or caregiver instructing the subject on coached breathing) may indicate to the coached breathing system a set of points to be selected from segmented 3-D point cloud 800 that may be used to model the subject's breathing in real time during coached breathing training.

It should be appreciated that while SOI 802 is described herein as defined by indicator lines 804 and 806, in other embodiments, SOI 802 may be indicated in a different manner without departing from the scope of this disclosure.

Returning to method 400, at 407, the method includes determining whether the initial SOI has been accepted by the user. In various embodiments, the display device is a touchscreen, and the user may select a control element on the display device to accept the initial SOI. Alternatively, the user may select a control on a user input device of the coached breathing system (e.g., on operator console 220 of FIG. 2).

If the initial SOI is not accepted at 407, method 400 proceeds to 408. At 408, method 400 includes modifying the initial SOI based on an input received from the user. For example, the input received from the user may include adjusted positions of indicator lines superimposed on a segmented 3-D point cloud, as described above.

If the initial SOI is accepted at 407, or once the initial SOI has been modified at 408, the method proceeds to 410. At 410, the method includes selecting a portion of the segmented 3-D point cloud (e.g., a second, smaller point cloud isolated from the segmented 3-D point cloud) corresponding to the accepted SOI. The isolated point cloud may be used to display a virtual topographic representation of a target area of the subject's body on the display device. The isolated point cloud may be a collection of points included within the accepted SOI, where selecting the isolated point cloud includes determining a set of points of the segmented 3-D point cloud of the subject's chest positioned between a first plane defined by a first indicator line of the accepted SOI, and a second plane defined by a second indicator line of the accepted SOI (e.g., boundary planes 814 and 816).

FIG. 8B shows an isolated point cloud 850 that may be selected from segmented 3-D point cloud 800 of FIG. 8A based on SOI 802. Isolated point cloud 850 may include points of 3-D point cloud 800 between first boundary plane 814 and second boundary plane 816. In other words, isolated point cloud 850 may include points of 3-D point cloud 800 having a Z coordinate between a first Z coordinate of first boundary plane 814, and a second Z coordinate of second boundary plane 816.

Returning to method 400, the virtual topographic representation of the target area of the subject's body (e.g., a portion of the subject's chest) may be displayed on the display device such that as the subject breathes, the virtual topographic representation is adjusted accordingly in real time. For example, as the subject inhales, the subject may view the virtual topographic representation expanding on the display device, and as the subject exhales, the subject may view the virtual topographic representation contracting on the display device.

Referring to FIG. 9, an exemplary breathing visualization 900 is shown, where breathing visualization 900 may be displayed on a screen 903 of a display device 902 of a coached breathing system, such as coached breathing system 208 of FIG. 2. Display device 902 may be a non-limiting example of patient display device 130 of FIG. 1A, head-mounted display 180 of FIG. 1B, and/or display device 162 of FIG. 1C. Breathing visualization 900 may be displayed to a subject of a medical imaging system during training on coached breathing, as described above.

Breathing visualization 900 includes a visual representation 906 of a chest of the subject, and a virtual topographic representation 904 of a portion of the chest of the subject. Visual representation 906 may be generated from a segmented 3-D point cloud, such as segmented 3-D point cloud 800 of FIG. 8A. Virtual topographic representation 904 may be generated from a SOI of the segmented 3-D point cloud. During training on the coached breathing system, virtual topographic representation 904 may be updated in real time to indicate a motion of the chest of the subject. For example, as the subject inhales, virtual topographic representation 904 may expand and grow larger, and as the subject exhales, virtual topographic representation 904 may contract and grow smaller. In other words, virtual topographic representation 904 may allow the subject to view a movement of their chest on screen 903 during breathing.

Breathing visualization 900 includes a set of breathing instructions 910 displayed on screen 903. Breathing instructions 910 may indicate to the subject when to inhale. In the depicted embodiment, an instruction "Inhale" may be displayed on screen 903 at a time when the subject is instructed to inhale, and may not be displayed on screen 903 when the subject is not instructed to inhale. Alternatively, the instruction "Inhale" may be displayed on screen 903, and may be highlighted or illuminated when the subject is instructed to inhale, and may not be highlighted or illuminated when the subject is not instructed to inhale. Similarly, an instruction "Exhale" may be displayed or highlighted on screen 903 at a time when the subject is instructed to exhale, and may not be displayed or highlighted on screen 903 when the subject is not instructed to exhale. An instruction "Breathe Hold" may be displayed or highlighted on screen 903 at a time when the subject is instructed to hold their breath, for example, between inhaling and exhaling, and may not be displayed or highlighted on screen 903 when the subject is not instructed to hold their breath. In this way, the set of instructions 910 may instruct the subject to follow a breathing pattern during various breathing cycles, where each breathing cycle includes one inhalation and one exhalation.

Breathing visualization 900 may include a timeline 908, which may depict a progression of the coached breathing over a predetermined duration of the coached breathing. During the training, an indicator 909 may indicate a current time during the predetermined duration. For example, at a beginning of the predetermined duration, indicator 909 may be positioned at a first end 920 of timeline 908. As time passes over the course of the predetermined duration, indicator 909 may move accordingly, until reaching a second end 921 of timeline 908. In various embodiments, the predetermined duration of the coached breathing may include a first, inhale stage of the coached breathing, and a second, exhale stage of the coached breathing, as described in greater detail below.

Additionally, in the depicted embodiment, timeline 908 is divided into four sections. A first section 912 and a second section 914 may correspond to the first stage of the coached breathing, during which a range of motion of the chest of the subject is measured with respect to a first reference point cloud associated with an inflated chest. Specifically, first section 912 may correspond to a time over which the subject is instructed to inhale. Between first section 912 and second section 914, the subject is instructed to hold their breath after inhaling, during which the first reference point cloud is generated. Second section 914 may correspond to a time during which the motion of the subject's chest is monitored. A third section 916 and a fourth section 918 may correspond to the second stage of the coached breathing, during which a range of motion of the chest of the subject is measured with respect to a second reference point cloud associated with a deflated chest. Specifically, a third section 916 may correspond to a time over which the subject is instructed to exhale. Between third section 916 and fourth section 918, the subject may be instructed to hold their breath after exhaling, during which the second reference point cloud is generated. Fourth section 918 may correspond to a time during which the motion of the subject's chest is monitored.

Each of first section 912, second section 914, third section 916, and fourth section 918 may be visually distinguishable from each other, for example, via coloration or shading. For example, first section 912 may have a first color or shading; second section 914 may have a second color or shading, third section 916 may have a third color or shading, and fourth section 918 may have a fourth color or shading (or may be colored or shaded similar to second section 914). In this way, the subject may view which portion of the breathing cycle the subject is currently in during training, and may determine how much remaining time is left before a subsequent portion of the breathing cycle. At the end of a breathing cycle, indicator 909 may move from second end 921 back to first end 920, to begin a next cycle.

The subject may follow the instructions during training. While following the instructions, the subject may view virtual topographic representation 904. Viewing virtual topographic representation 904 during breathing may aid the subject in reproducing or following a target or selected breathing pattern, where the selected breathing pattern may reduce a movement of the chest.

Further, in some embodiments, a 3-D coached breathing model may be generated and displayed on screen 903 along with virtual topographic representation 904, where the 3-D coached breathing model may be a target 3-D virtual representation of the portion of the surface of the subject's chest that moves in real time as the subject breathes. Thus, the target 3-D virtual representation may model a target motion of the subject's chest. For example, the coached breathing model may be aligned with and/or superimposed on virtual topographic representation 904. The coached breathing model may indicate to the subject a specific desired position of the portion of the surface of the chest at various times during a breathing cycle, such that the subject may adjust their breathing to match a first position of virtual topographic representation 904 with a second position of the coached breathing model.

Because the coached breathing model is generated based on acquired LiDAR/3-D camera data, an advantage of using the coached breathing model is that the coached breathing model may show how a particular subject's chest should move during breathing, in a customized manner. For example, during breathing, not every point on the chest may move up, or down, or in a same direction at a same time. Some breathing patterns may entail breathing from the diaphragm, while other breathing patterns may entail breathing using chest muscles. By trying to match the coached breathing model to virtual topographic representation 904, the subject may more quickly and efficiently achieve a selected breathing pattern. Additionally, the coached breathing model may "gamify" the task of achieving the selected breathing pattern, where the visual task of matching the coached breathing model to virtual topographic representation 904 may be easier, more entertaining, and/or more engaging than following the breathing instructions 910. Generation of the coached breathing model is described below in reference to FIG. 5A.

Returning to FIG. 4, at 412, method 400 includes training the subject with on-screen training instructions (e.g., breathing instructions 910) and the virtual topographic representation (e.g., virtual topographic representation 904) of the portion of the surface of the chest of the subject, for self-calibration of a breathing pattern by the subject. Training the subject for self-calibration of the breathing pattern is described in greater detail below in reference to FIG. 5A.

At 414, method 400 includes performing a scan using the medical imaging system, and acquiring image data while the subject is practicing the breathing pattern. Acquiring the image data while the subject is practicing the breathing pattern is described in greater detail below in reference to FIG. 7.

At 416, method 400 includes reconstructing an image from the acquired image data, and displaying the image on a display device of the medical imaging system (e.g., display device 232 of FIG. 2). Alternatively, the image may be stored in a memory of the medical imaging system (e.g., mass storage 218). As a result of the subject performing the coached breathing, the reconstructed image may be of higher quality than if the subject did not follow the selected breathing pattern.

Figure 5A:
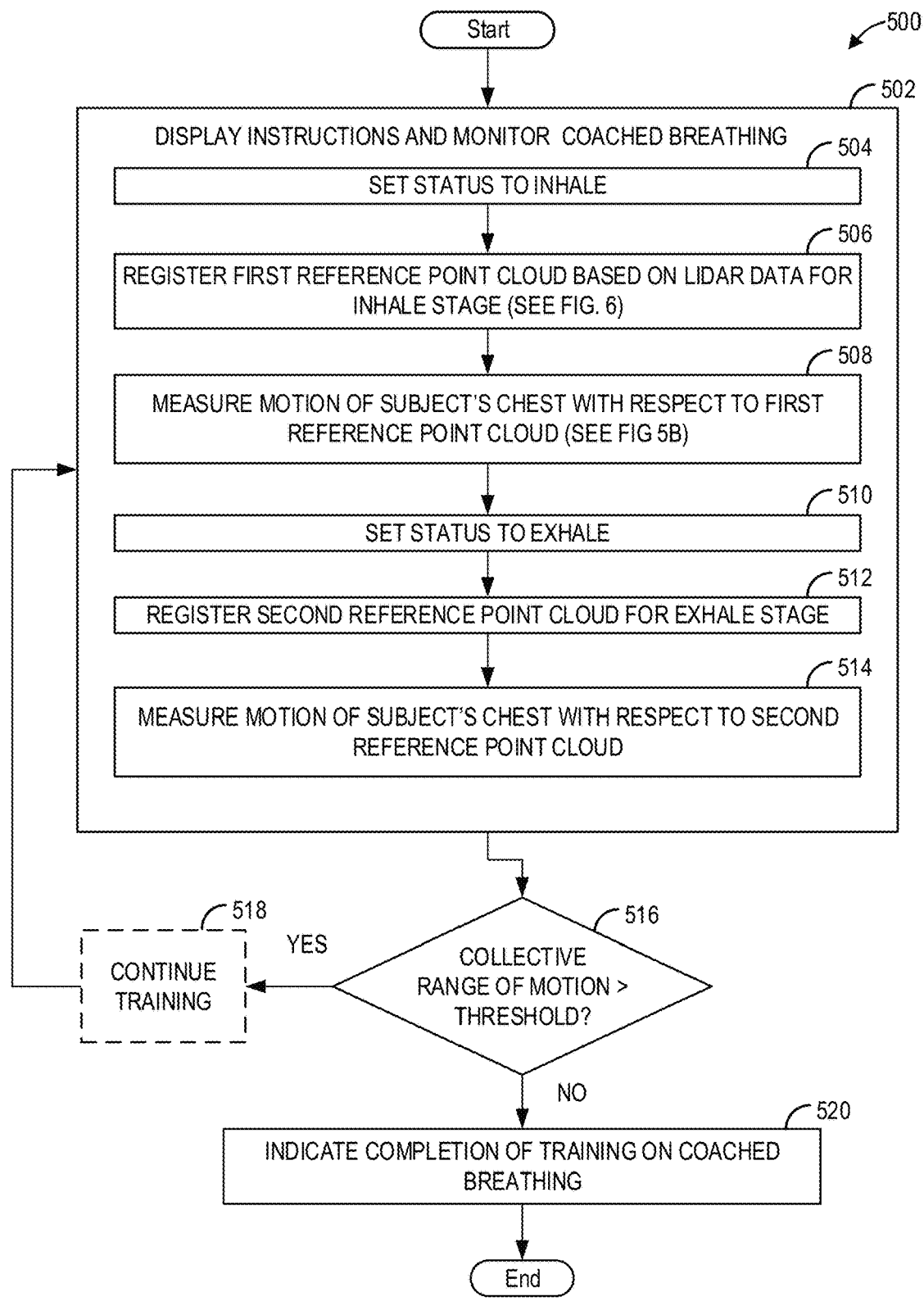
FIG. 5A is a flowchart illustrating an exemplary method for performing coached breathing, in accordance with one or more embodiments of the present disclosure.

Turning now to FIG. 5A, an exemplary method 500 is shown for training a subject of a medical imaging system in coached breathing prior to performing a scan, via a visual display including on-screen training instructions. As described above, the visual display may include an interactive visualization of a portion of the surface of the subject's chest, which may aid the subject in achieving a selected breathing pattern. The visual display may be displayed on a screen of a display device of the coached breathing system, such as display device 130 of FIG. 1A and/or display device 162 of FIG. 1C.

Method 500 begins as 502, where the method includes displaying instructions to the subject to perform coached breathing, and monitoring the coached breathing for a predetermined duration. For example, the predetermined duration may be five minutes for a child, and 10 minutes for an adult. In various embodiments, the coached breathing includes a first stage and a second stage. During the first stage, a motion of the subject's chest is monitored and measured with respect to a first set of 3-D points of a surface of the subject's chest (e.g., a first reference point cloud), where the first reference point cloud corresponds to a position of the subject's chest in an inflated state after an inhalation. During the second stage, the motion of the subject's chest is monitored and measured with respect to a second set of 3-D points of the surface of the subject's chest (e.g., a second reference point cloud), where the second reference point cloud corresponds to a position of the subject's chest in a deflated state after an exhalation.

At 504, displaying the instructions and monitoring the coached breathing includes setting a status of the coached breathing system to an inhale status. When the inhale status is set, the inhale stage of the coached breathing may be initiated. During the inhale stage, a range of motion of the subject's chest during inhalations may be measured with respect to an inflated chest to determine whether a range of motion of the subject's chest exceeds a threshold range of motion. Instructions may be displayed on the screen for the subject to perform an inhalation. For example, a written instruction to inhale may be displayed or illuminated on the screen for a duration of an inhalation, as described above in reference to FIG. 9. Additionally, the inhale status may be indicated on a timeline displayed on the screen (e.g., timeline 908), for example via an illumination or highlighting of a portion of the timeline corresponding to a desired duration of inhalation, an arrow (e.g., indicator 909) indicating a current time in relation to the timeline, or a different visual indication. For example, the desired duration of inhalation may be five seconds. After performing the inhalation, instructions may be displayed on the screen for the subject to hold their breath for a first predetermined duration. For example, the first predetermined duration may be 10 seconds.

At 506, performing the coached breathing cycle includes registering a first reference point cloud based on LiDAR data while the subject is holding their breath, where the first reference point cloud is a set of 3-D points on a surface of a chest (and/or abdomen) of the subject. Registering the first reference point cloud based on the LiDAR data is described in greater detail in reference to FIG. 6.

Figure 6:
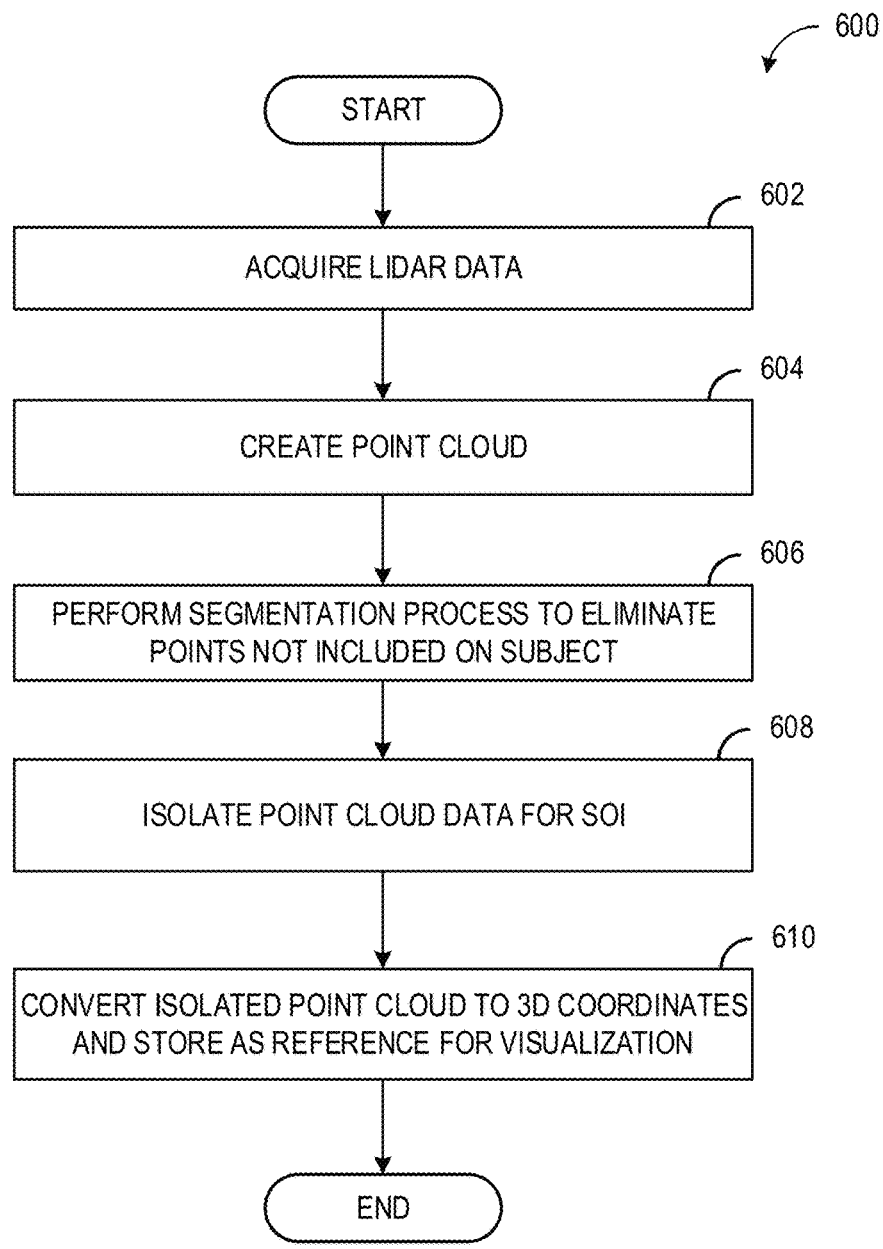
FIG. 6 is a flowchart illustrating an exemplary method for acquiring and processing LiDAR data during coached breathing, in accordance with one or more embodiments of the present disclosure.

Turning to FIG. 6, a method 600 is shown for registering a point cloud corresponding to a surface of a chest of a subject of a medical imaging exam based on LiDAR data. Method 600 may be executed within a coached breathing system of a medical imaging system as part of a method for performing coached breathing, such as method 500 of FIG. 5A.

At 602, method 600 includes acquiring a first set of LiDAR data. The LiDAR data may be acquired via a LiDAR imaging device of the coached breathing system, such as secondary imaging device 105 and/or secondary imaging device 164. In various embodiments, the secondary imaging device may be integrated into a medical imaging system, such as CT imaging system 100.

At 604, method 600 includes creating a point cloud from the acquired LiDAR data. The point cloud may include a plurality of points detected by the LiDAR imaging device on a surface of the chest of the subject. At 606, method 600 includes performing a segmentation process to eliminate points detected by the LiDAR imaging device that are not on the surface of the chest (e.g., points on the surface of a table or bed on which the subject is positioned, such as table 114 and/or table 173 of FIGS. 1A and 1C, respectively).

At 608, method 600 includes isolating point cloud data for an SOI of the segmented point cloud. In various embodiments, the SOI may be indicated by an operator of the coached breathing system via an input device of the coached breathing system, such as operator console 220 of FIG. 2. The operator may indicate the SOI by adjusting indicator lines on a visualization of the segmented point cloud, as described in reference to FIG. 8A. After the operator indicates the SOI, the coached breathing system may determine a set of points of the segmented point cloud located within the indicator lines.

At 610, method 600 includes converting the isolated point cloud corresponding to the SOI to 3-D coordinates for display on a display device of the coached breathing system (e.g., display device 130 and/or 162). The 3-D coordinates may be stored and used as a reference for generating an interactive visualization of the chest of the subject while the subject is performing coached breathing, as described above in reference to FIG. 5A.

Returning to FIG. 5A, at 508, displaying the instructions and monitoring the coached breathing includes measuring the motion of the subject's chest with respect to the first reference point cloud. Instructions may be displayed on the screen for the subject to breathe in accordance with a predetermined breathing pattern. For example, in accordance with the predetermined breathing pattern, a written instruction to inhale may be displayed or illuminated on the screen for a duration of a requested inhalation, and a written instruction to exhale may be displayed or illuminated on the screen for a duration of a requested exhalation, as described above in reference to FIG. 9. Additionally, in some breathing patterns, the subject may be instructed to hold their breath. While the subject is breathing in accordance with the predetermined breathing pattern, the motion of the subject's chest during inhalations may be measured. The measuring of the motion of the subject's chest is described in greater detail below in reference to FIG. 5B.

Figure 5B:
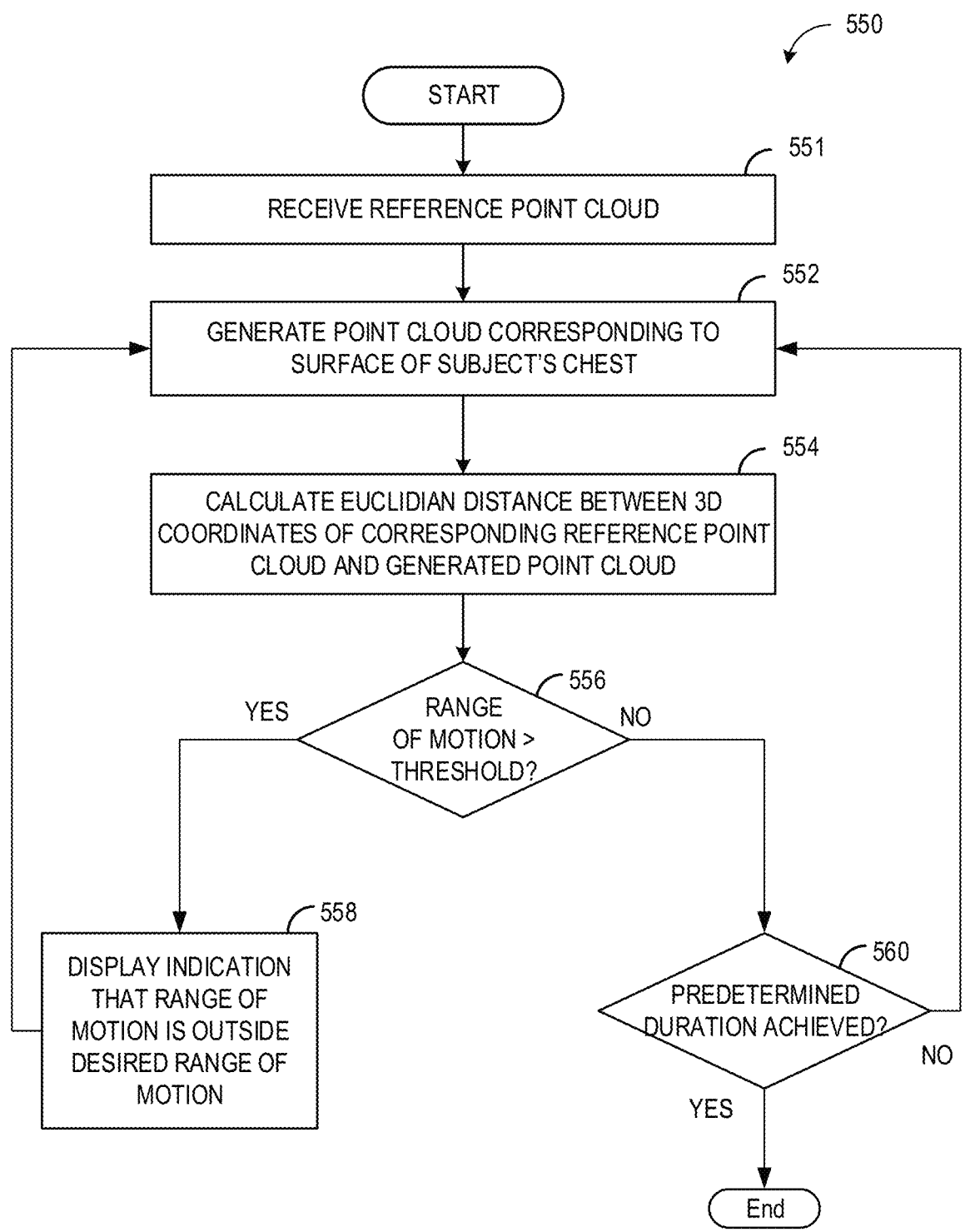
FIG. 5B is a flowchart illustrating an exemplary method for measuring a motion of a subject's chest during coached breathing, in accordance with one or more embodiments of the present disclosure.

Referring to FIG. 5B, a method 550 illustrates a procedure for measuring a motion of a subject's chest during coached breathing on coached breathing system 208. In various embodiments, method 550 may be performed as part of method 500 described above. It should be appreciated that the steps of method 550 may be repeated iteratively a plurality of times, until a predetermined duration has been achieved. For example, the predetermined duration may correspond to a length of an inhale stage of coached breathing, or an exhale stage of coached breathing. In various embodiments, method 550 may be performed at regular intervals, such as, for example, every millisecond.

Method 550 begins at 551, where method 550 includes receiving a reference point cloud. The reference point cloud may be a cloud of points corresponding to a surface of the subject's chest at an initial point in time, against which other point clouds corresponding to the surface of the subject's chest are measured during coached breathing. For example, the reference point cloud may correspond to the surface of the subject's chest when the chest is in an inflated state after an inhalation (e.g., the first reference point cloud of FIG. 5A), or the reference point cloud may correspond to the surface of the subject's chest when the chest is in a deflated state after an exhalation (e.g., the second reference point cloud of FIG. 5A).

At 552, method 550 includes generating a point cloud corresponding to a surface of the subject's chest while the subject is breathing (e.g., in accordance with a breathing pattern). In various embodiments, the point cloud may be generated by following one or more steps of FIG. 6, as described above in relation to generating the first reference point cloud. The SOI used to generate the point cloud may be the same as the SOI selected by the operator for the first reference point cloud.

At 554, method 550 includes calculating, at each regular interval t at which a point cloud of the subject's chest is generated, a distance metric between the points of the reference point cloud and points of the generated point cloud, to estimate a range of motion of the chest during breathing. In various embodiments, the distance metric may be based on a Euclidian distance between each point of the first point cloud and the corresponding point of the second point cloud. For example, the distance metric may be an average Euclidian distance of each pair of points.

In some embodiments, the distance metric may be a weighted average Euclidian distance, where certain portions of the first and second point clouds are weighted more heavily than other portions of the first and second point clouds. For example, the weightings of the distance metric may depend on a breathing pattern that the subject is instructed to match. A first breathing pattern may involve breathing with lungs, where the subject is instructed to move respective portions of the first and second point clouds corresponding to an upper portion of the chest as they breathe to a greater extent than portions of the first and second point clouds corresponding to a lower portion of the chest. A second breathing pattern may involve breathing with a diaphragm, where the subject is instructed to move respective portions of the first and second point clouds corresponding to the lower portion of the chest as they breathe to a greater extent than portions of the first and second point clouds corresponding to the upper portion of the chest. If the subject is coached to match the first breathing pattern, the Euclidean distances between points of the first and second point clouds corresponding to the upper portion of the chest may be weighted more heavily than the Euclidean distances between points of the first and second point clouds corresponding to the lower portion of the chest. Alternatively, if the subject is coached to match the second breathing pattern, the Euclidean distances between points of the first and second point clouds corresponding to the lower portion of the chest may be weighted more heavily than the Euclidean distances between points of the first and second point clouds corresponding to the upper portion of the chest. In this way, the estimated range of motion of the subject's chest may be defined based on a selected breathing pattern.

At 556, method 500 includes determining whether the estimated range of motion of the chest exceeds a threshold range of motion. If the estimated range of motion exceeds the threshold range of motion, it may be inferred that the subject is not breathing in accordance with the selected breathing pattern, where an expansion of the subject's chest exceeds desired parameters of the breathing pattern.

Referring briefly to FIG. 10, a breathing graph 1000 shows two plots, where a first plot 1002 depicts a first exemplary breathing pattern of a subject and a second plot 1004 depicts a second exemplary breathing pattern of the subject. Time is indicated on an x-axis of breathing graph 1000, and an acceptability of a range of motion of the subject's chest during breathing is indicated on a y-axis of breathing graph 1000. An expansion of the subject's chest during an inhalation is indicated by a upward peak (e.g., in a direction 1030), and a contraction of the subject's chest during an exhalation is indicated by a downward peak (e.g., in a direction 1032).

The first exemplary breathing pattern is a shallow breathing pattern, including a first inhalation 1003, an exhalation 1005, and a second inhalation 1007. The range of motion of the subject's chest during the first exemplary breathing pattern may be defined by a distance 1020 between a largest expansion of the subject's chest during the first inhalation 1003, at a point 1040, and a smallest contraction of the subject's chest during the exhalation 1005, at a point 1042. Distance 1020 may be less than a threshold range of motion, whereby the range of motion of the subject's chest during the first exemplary breathing pattern is acceptable.

In contrast, the second exemplary breathing pattern is a deeper breathing pattern, including a first inhalation 1010, and an exhalation 1012. The range of motion of the subject's chest during the second exemplary breathing pattern may be defined by a distance 1022 between a largest expansion of the subject's chest during the first inhalation 1010, at a point 1011, and a smallest contraction of the subject's chest during the exhalation 1012, at a point 1013. Distance 1022 may be greater than the threshold range of motion, whereby the range of motion of the subject's chest during the first exemplary breathing pattern is considered excessive acceptable.

Returning to method 550, if at 556 it is determined the estimated range of motion exceeds the threshold range of motion, method 500 proceeds to 558. At 558, method 550 includes notifying the subject that the breathing of the subject does not adhere to the selected breathing pattern, and method 550 proceeds back to 552 to continue measuring the motion of the subject's chest at a next regular interval t.

In some embodiments, the subject may be notified on the display device of the coached breathing system. For example, a visual indication that the subject has not adhered to the breathing pattern may be displayed on the display device, in written words, or the appearance of a graphical element, or by illuminating, highlighting or displaying an existing element of the display in a different color. Additionally or alternatively, the subject may be notified via an indicator light positioned in an environment of the subject (e.g., lights or lighted portions of interior surface 120, edge 121 and/or front surface 122 of gantry 102 of FIG. 1A or LED light 172 of FIG. 1C), or via an audio notification (e.g., a sound, or recording of a voice) played on a speaker of the coached breathing system and/or in the environment of the subject, or via haptic feedback (e.g., vibration), or in a different manner.

If at 556 it is determined the estimated range of motion does not exceed the threshold range of motion, it may be inferred that the subject is adhering to the selected breathing pattern, and method 550 proceeds to 560.

At 560, method 500 includes determining whether a predetermined duration of coached breathing has been achieved. The predetermined duration may correspond to a stage of coached breathing, such as an inhale stage (where the motion of the subject's chest is measured with respect to an inflated chest), or an exhale stage (where the motion of the subject's chest is measured with respect to a deflated chest). For example, the predetermined duration may be 10 minutes.

If at 560 it is determined that the predetermined duration has not been achieved, method 500 proceeds back to 552, to continue monitoring the range of motion of the subject's chest during a next regular interval t of the coached breathing. Alternatively, if at 560 is determined that the predetermined duration has been achieved, method 550 ends.

Returning to FIG. 5A, at 510, displaying the instructions and monitoring the coached breathing includes setting a status of the coached breathing system to an exhale status. When the exhale status is set, the exhale stage of the coached breathing may be initiated. Instructions may be displayed on the screen for the subject to perform an exhalation. For example, a written instruction to exhale may be displayed or illuminated on the screen for a duration of an exhalation, as described above in reference to FIG. 9. During the exhale stage, a range of motion of the subject's chest may be measured with respect to a deflated chest to determine whether a range of motion of the subject's chest exceeds the threshold range of motion. The exhale status may be indicated on the timeline displayed on the screen. The desired duration of the exhale stage may be equal to the duration of the inhale stage, or the desired duration of the exhale stage may be different from the duration of the inhale stage. After performing the exhalation, instructions may be displayed on the screen for the subject to hold their breath for a second predetermined duration, which may be equal to the first predetermined duration.

At 512, displaying the instructions and monitoring the coached breathing includes registering a second reference point cloud on the surface of the chest (and/or abdomen) of the subject based on LiDAR data while the subject is holding their breath, as described above in reference to FIG. 6. In other words, the first reference point cloud is registered at a first time, at which the chest of the subject may be in an inflated position as a result of a previous inhalation. The second reference point cloud is registered at a second, later time, at which the chest of the subject may be in a deflated position as a result of a previous exhalation. Thus, the first reference point cloud will be referenced by a first set of 3-D coordinates, and the second reference point cloud will be referenced by a second, different set of 3-D coordinates.

At 514, displaying the instructions and monitoring the coached breathing includes measuring the motion of the subject's chest with respect to the second reference point cloud. Instructions may be displayed on the screen for the subject to breathe in accordance with the predetermined breathing pattern. For example, in accordance with the predetermined breathing pattern, a written instruction to inhale may be displayed or illuminated on the screen for a duration of a requested inhalation, and a written instruction to exhale may be displayed or illuminated on the screen for a duration of a requested exhalation, as described above in reference to FIG. 9. Additionally, in some breathing patterns, the subject may be instructed to hold their breath. While the subject is breathing in accordance with the predetermined breathing pattern, the motion of the subject's chest may be measured. The motion of the subject's chest may be measured as described above in reference to FIG. 5B. As with the inhale stage, if the range of motion of the subject's chest is not within the threshold range of motion, an indication may be provided to the subject, for example, via an indicator light or on a display screen of the coached breathing system. After a predetermined duration of the exhale stage, measurement of the range of motion of the subject's chest may end, and method 500 proceeds to 516. At 516, method 500 includes determining whether a collective range of motion of the subject's chest during both of the inhale stage and the exhale stage exceed the threshold range of motion. For example, the collective range of motion may be an average of a plurality of measurements of the distance between the surface of the subject's chest and a reference point cloud (e.g., either the first reference point cloud or the second reference point cloud). In some embodiments, the collective range of motion may be a weighted average of the plurality of measurements. For example, a first average range of motion of the subject's chest during the inhale stage may be weighted more heavily than a second average range of motion of the subject's chest during the exhale stage, or the first average range of motion of the subject's chest during the inhale stage may be weighted less heavily than the second average range of motion of the subject's chest during the exhale stage.

If the collective range of motion of the subject's chest exceeds the threshold range of motion, method 500 proceeds to 518. At 518, method 500 may include continuing with training of the subject on coached breathing, whereby method 500 proceeds back to 502. Alternatively, if the collective range of motion of the subject's chest does not exceed the threshold range of motion, method 500 proceeds to 520. At 520, method 500 includes indicating to the subject and/or an operator of the coached breathing system that the subject has completed the training on coached breathing, and method 500 ends.

Figure 7:
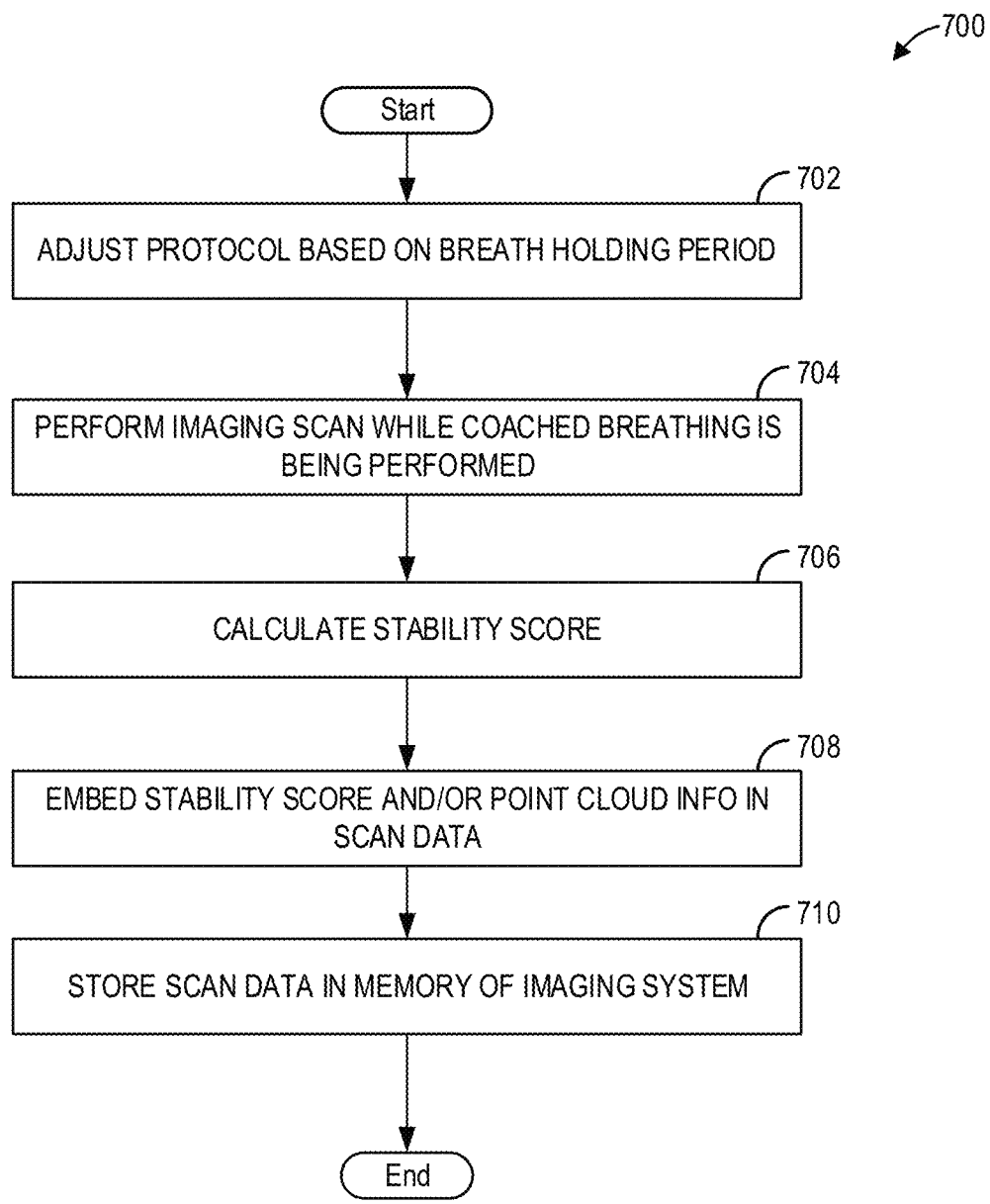
FIG. 7 is a flowchart illustrating an exemplary method for acquiring image data during a medical imaging scan, using coached breathing, in accordance with one or more embodiments of the present disclosure.

Referring now to FIG. 7, an exemplary method 700 is shown for performing a medical imaging scan on a subject while the subject is performing coached breathing. The subject may have undergone a training session on coached breathing prior to the medical imaging scan, as described above in reference to FIG. 5A. In one embodiment, the subject is trained on coached breathing at a first location, such as the training room depicted in FIG. 1C. The subject may successfully complete the training, whereby the subject may demonstrate adherence to a selected breathing pattern during a specified duration. After completing the training, the subject may be placed on a table of an imaging system, such as CT imaging system 100 of FIG. 1A, and positioned within a gantry of the imaging system. In some embodiments, the subject may be positioned on the table such that the subject can view an external display device of a coached breathing system of the imaging system, such as display device 130 of FIG. 1A. During acquisition of projection data during the exam, the subject may view coached breathing instructions on the display device, where the coached breathing instructions may include a 3-D visualization of a portion of the subject's chest that moves in real time as the subject inhales and exhales. Additionally, a 3-D coached breathing model may be displayed proximate to or superimposed on the 3-D visualization, where the 3-D coached breathing model may indicate a target position of the chest in real time, such that the subject may adhere to a selected breathing pattern by matching a motion of the subject's chest as indicated by the 3-D visualization to the 3-D coached breathing model. In other embodiments, the instructions, 3-D visualization, and 3-D coached breathing model may be displayed to the subject you a head-mounted display, such as head-mounted display 180 of FIG. 1B.

At 702, method 700 includes adjusting a protocol of the medical imaging scan based on a breath-holding period of the subject. The breath-holding period may be a duration over which the subject can consistently and reliably hold their breath between inhalations and exhalations, which may be determined as a result of the training session on the coached breathing. Different subjects may have different breath-holding periods.

The protocol may be selected based on a type of medical imaging scan performed and/or a region of interest of the subject being scanned. For example, an operator of the imaging system may select the protocol using an input device of the imaging system (e.g., display device 232), or the protocol may be automatically selected based on one or more parameters of the medical imaging scan established by the operator. In various embodiments, the protocol may include a setting for the breath-holding period that may vary between subjects. For example, a first subject may be able to hold their breath consistently and reliably for a first, shorter duration, and a second subject may be able to hold their breath consistently and reliably for a second, longer duration. The protocol may be adjusted between performing a first scan on the first subject and performing a second scan on the second subject, to account for a difference between the first duration and the second duration. During the first scan, a first acquisition of projection data may depend on the first duration, and during the second scan, a second acquisition of projection data may depend on the second duration.

At 704, method 700 includes performing the medical imaging scan while the subject is performing the coached breathing. As described above, during the coached breathing, the subject may follow breathing instructions displayed on the display device, using a visual representation of a portion of their chest as a guide and/or matching the visual representation with a 3-D coached breathing model displayed on the display device.

At 706, method 700 includes calculating a stability score of the subject, based on the subject performance of the coached breathing. The stability score may be a value generated by the coached breathing system that indicates a degree of stability of the chest of the subject during breathing. For example, a high stability score may indicate that the subject was able to maintain a range of motion of their chest within a minimum threshold range of motion with a high degree of precision and consistency. A low stability score may indicate that the subject was not able to maintain the range of motion of their chest within the minimum threshold range of motion with the high degree of precision and consistency. For example, the low stability score may be a result of the subject becoming anxious, and breathing more quickly and/or taking deeper breaths. Because a quality of an image reconstructed from the projection data acquired during the coached breathing may depend on the degree of stability of the subject's chest, images with a higher quality may be generated from a subject with a high stability score than may be generated from a subject with a low stability score.

In some embodiments, the stability score S may be calculated using the following equation:

$$S=\|PCC_{initial}-\max(|PCC_{scan_{duration}}|)\| \quad (1)$$

where PCC are point cloud coordinates. In other words, the stability score may be based on an overall difference between a first set of point cloud coordinates corresponding to a smallest expansion of the chest and a second set of point cloud coordinates corresponding to a largest expansion of the chest, as described above in reference to the inhale stage, or an overall difference between a first set of point cloud coordinates corresponding to the largest expansion of the chest and a second set of point cloud coordinates corresponding to the smallest expansion of the chest, as described above in reference to the exhale stage. In other embodiments, the stability score may be generated based on a different equation. For example, if the subject is following a breathing pattern based on relative motion of different parts of the subject's chest and/or abdomen (e.g., upper chest breathing vs. diaphragm breathing), the stability score may be calculated based on relative differences between portions of the first point cloud and corresponding portions of the second point cloud, where other portions of the first and second point clouds may not contribute to the stability score.

At 708, method 700 includes embedding the stability score in the scan data acquired during the medical imaging scan. For example, the stability score may be included in metadata of the medical imaging scan, which may be stored along with projection data used for image reconstruction. In some embodiments, isolated point cloud data (e.g., the visual representation of the portion of the subject's chest) generated by the coached breathing system and displayed on the display device may also be stored in the metadata.

At 710, method 700 includes storing the scan data acquired during the medical imaging scan in a memory of the imaging system. For example, the scan data may be stored in a memory of computing device 216, or in mass storage 218 of FIG. 2. By including the stability score in the scan data, a record of the subject's performance of the coached breathing during the scan may be linked to the scan data, which may provide a prior indication of a quality of images generated from the scan. The stability score could be stored by quality control systems associated with the images. Since the stability score can be correlated with image quality, CT exams or scans may be sorted using the stability score. In such cases, exams with a high stability score can be examined first, if preferred.

Additionally, the stability score could become a searchable parameter. For example, a radiologist may wish to review select historical images generated during a series of scans performed on a patient over time. The radiologist may wish to view images above a threshold quality, and may not wish to view images below the threshold quality. The radiologist may set a filter of the medical imaging system to search for images generated from scans of the patient with high embedded stability scores. By viewing the images with high embedded stability scores and not viewing images that do not have high embedded stability scores, the radiologist may more quickly and efficiently discover and review the higher-quality images, as compared to an alternative scenario where the stability scores are not embedded in the scan data.

Thus, a coached breathing system for a medical imaging system is disclosed herein that, in contrast with other coached breathing systems, displays a 3-D visualization of a selected portion of a subject's chest on a display device with breathing instructions while the subject is practicing or performing coached breathing, where the selected portion may be adjusted to include a smaller surface area of the chest (e.g., a reduced set of points on the subject's chest) than a full surface of the chest (e.g., spanning an entire torso of the subject). The smaller surface area may be selected by an operator to span a specific part of the chest that expands and contracts during a specific breathing pattern. For example, a first breathing pattern may entail moving an upper part of the chest associated with lungs of the subject, and a second breathing pattern may entail moving a lower part of the chest associated with a diaphragm of the subject. For example, a first scan may be performed on an abdomen of the subject, and a second scan may be performed on a lung of the subject. A quality of the first scan may rely on the subject following a first breathing pattern, while a quality of the second scan may rely on the subject following a second breathing pattern. For example, the first breathing pattern may involve expanding muscles of the chest to breathe, while not moving the abdomen. The second breathing pattern may involve expanding a diaphragm of the subject to breathe, while not moving the chest.

In this way, during the coached breathing, the operator may display only a portion of the chest relevant to the specific breathing pattern, and not display portions of the chest that are not relevant to the specific breathing pattern. By displaying the selected portion as opposed to an alternative 3-D visualization including a larger surface area, an amount of memory and/or processing resources used by the coached breathing system and/or the medical imaging system for generating the 3-D visualization may be reduced, increasing a performance and functioning of the coached breathing system and/or medical imaging system. As a result of the reduction in the amount of memory and/or processing resources used for generating the 3-D visualization, a greater amount of the resources may be made available to other medical imaging and/or other tasks. Additionally, a performance of the subject on the coached breathing may be increased, generating less movement of the subject's chest during the medical imaging, resulting in reconstructed images of a higher quality. As a result of the higher quality reconstructed images, an evaluation and/or diagnosis of the subject may be more accurate.

Further, a 3-D coached breathing model may be generated based on the 3-D visualization, and displayed concurrently with the 3-D visualization (e.g., superimposed on the 3-D visualization), where the 3-D coached breathing model may be a target 3-D virtual representation of the selected portion that moves in real time as the subject breathes. The target 3-D virtual representation may model a target motion of the subject's chest. The 3-D coached breathing model may indicate to the subject how to adjust their breathing with respect to the 3-D coached breathing model to achieve a selected breathing pattern, where the 3-D coached breathing model shows a personalized, modified shape of the 3-D visualization in real time based on the subject's breathing. By displaying the 3-D coached breathing model along with the 3-D visualization of the subject's breathing, the subject may more rapidly adopt the selected breathing pattern, reducing an amount of time spent by the subject performing the coached breathing. By reducing amount of time spent by the subject performing the coached breathing, the amount of memory and/or processing resources used by the coached breathing system and/or the medical imaging system for generating the 3-D visualization and the 3-D coached breathing model may be reduced, increasing a performance and functioning of the coached breathing system and/or medical imaging system and freeing up the resources for other tasks, and further increasing the quality of resulting reconstructed images. Additionally, by generating the 3-D coached breathing model based on the 3-D visualization rather than generating the 3-D coached breathing model from scratch without relying on the 3-D visualization, computational and memory resources of the coached breathing system and/or medical imaging system may be more efficiently used and/or reduced.

The disclosure also provides support for a method for a medical imaging system, the method comprising: via a sensor system of the medical imaging system that acquires data of a surface of a chest of a subject of the medical imaging system, generating a three-dimensional (3-D) virtual representation of a portion of the surface, the portion adjustable in size by an operator of the medical imaging system, displaying changes in the 3-D virtual representation to the subject on a display device of the medical imaging system while the subject breathes, in real time, displaying instructions to the subject on the display device to perform coached breathing in accordance with a selected breathing pattern, and in response to detecting a deviation of a breathing pattern of the subject from the selected breathing pattern, indicating the deviation to the subject. In a first example of the method, displaying the instructions to perform coached breathing in accordance with the selected breathing pattern further comprises: displaying instructions indicating when to initiate an inhalation, when to initiate an exhalation, and when to hold their breath, and displaying a timeline indicating a duration of the inhalation, a duration of the exhalation, and a duration over which the subject holds their breath. In a second example of the method, optionally including the first example, indicating the deviation to the subject as a result of detecting the deviation further comprises: in response to determining that the deviation exceeds a threshold deviation, performing at least one of the following: displaying an indication of the deviation on the display device, illuminating a light or visual indicator included in an environment of the CT imaging system, illuminating a light or visual indicator of the medical imaging system, providing haptic feedback (e.g., vibration) to the subject, and providing an audio notification of the deviation. In a third example of the method, optionally including one or both of the first and second examples, determining that the deviation exceeds the threshold deviation further comprises: generating a first cloud of points associated with the portion of the surface of the chest while the subject is holding their breath after an inhalation, generating a second cloud of points associated with the portion of the chest while the subject is holding their breath after an exhalation, calculating a Euclidean distance between the first cloud of points and the second cloud of points, and determining whether the Euclidean distance exceeds a threshold distance. In a fourth example of the method, optionally including one or more or each of the first through third examples, generating either of the first cloud of points or the second cloud of points further comprises: acquiring data of the surface of the chest via one of a LiDAR system and a 3-D camera, creating a 3-D point cloud based on the data, isolating a portion of the 3-D point cloud associated with the portion of the surface, and measuring 3-D coordinates of the isolated portion. In a fifth example of the method, optionally including one or more or each of the first through fourth examples, the portion of the surface of the chest is defined by an operator of the medical imaging system based on a scan protocol and a position of visual elements adjusted by the operator on a visualization of the 3-D point cloud. In a sixth example of the method, optionally including one or more or each of the first through fifth examples, the one of the LiDAR system and the 3-D camera are included in the medical imaging system, and the data is acquired while the subject is positioned on a table of the medical imaging system. In a seventh example of the method, optionally including one or more or each of the first through sixth examples, the one of the LiDAR system and the 3-D camera are included in a coached breathing training room, and the data is acquired while the subject is preparing for a scan in the coached breathing training room. In an eighth example of the method, optionally including one or more or each of the first through seventh examples, displaying the instructions to perform coached breathing in accordance with the selected breathing pattern further comprises displaying a breathing guidance model generated based on the 3-D virtual representation for the subject to follow, the breathing guidance model showing a target motion of a personalized, modified shape of the 3-D virtual representation superimposed on the 3-D virtual representation while the subject breathes. In a ninth example of the method, optionally including one or more or each of the first through eighth examples, displaying the breathing guidance model further comprises: during a first breathing cycle, the first breathing cycle including one inhalation and one exhalation: storing the 3-D virtual representation of the portion of the surface of the chest at each increment of time of a plurality of increments of time over the first breathing cycle, applying a transform function to each 3-D point of each stored 3-D virtual representation to generate a target 3-D virtual representation at each increment of time, and during each subsequent breathing cycle, displaying each target 3-D virtual representation at each increment of time over the subsequent breathing cycle. In a tenth example of the method, optionally including one or more or each of the first through ninth examples, displaying the breathing guidance model further comprises: displaying a target 3-D virtual representation at each increment of time of a plurality of increments of time over each breathing cycle, the breathing cycle including one inhalation and one exhalation, the target 3-D virtual representation based on a distance between each point of the first cloud of points and a corresponding point of the second cloud of points and an elapsed duration of the breathing cycle. In a eleventh example of the method, optionally including one or more or each of the first through tenth examples, a modality of the medical imaging system includes: computed tomography (CT), magnetic resonance imaging (MR), positron emission tomography (PET), and nuclear medicine (NM) imaging. In a twelfth example of the method, optionally including one or more or each of the first through eleventh examples, the selected breathing pattern is selected by the operator from a plurality of breathing patterns based on a scan protocol, anatomical region of the subject, and/or characteristics of the subject. In a thirteenth example of the method, optionally including one or more or each of the first through twelfth examples, the method further comprises: generating a stability score for the subject based on a stability of the chest of the subject during performance of the subject on the coached breathing during a medical imaging scan, and storing the stability score in scan data acquired during the medical imaging scan.

The disclosure also provides support for a medical imaging system, comprising: an X-ray controller including one or more processors having executable instructions stored in a non-transitory memory of the medical imaging system that, when executed, cause the one or more processors to: generate a three-dimensional (3-D) virtual representation of a portion of a surface of a chest of a subject of the medical imaging system, the portion adjustable in size by an operator of the medical imaging system, display changes in the 3-D virtual representation to the subject on a display device of the medical imaging system while the subject performs coached breathing, in real time, display instructions to the subject on the display device to perform the coached breathing in accordance with a selected breathing pattern, using the 3-D virtual representation as a guide, and in response to detecting a deviation of a breathing pattern of the subject from the selected breathing pattern, indicate the deviation to the subject. In a first example of the system, detecting the deviation of the breathing pattern of the subject from the selected breathing pattern further comprises: while the subject is holding their breath after an inhalation: creating a first 3-D point cloud from data of the surface of the chest acquired via one of a LiDAR system and a 3-D camera, isolating a first portion of the first 3-D point cloud associated with the portion of the surface, and measuring 3-D coordinates of the isolated first portion to generate a first cloud of points associated with the portion of the surface of the chest, while the subject is holding their breath after an exhalation: creating a second 3-D point cloud from data of the surface of the chest acquired via the one of a LiDAR system and a 3-D camera, isolating a second portion of the second 3-D point cloud associated with the portion of the surface, and measuring 3-D coordinates of the isolated second portion to generate a second cloud of points associated with the portion of the chest, calculating a Euclidean distance between the first cloud of points and the second cloud of points, and determining whether the Euclidean distance exceeds a threshold distance. In a second example of the system, optionally including the first example, the one of the LiDAR system and the 3-D camera are included in a coached breathing training room, and the data of the surface of the chest is acquired while the subject is preparing for a scan in the coached breathing training room. In a third example of the system, optionally including one or both of the first and second examples, further instructions are stored in the non-transitory memory of the medical imaging system that, when executed, cause the one or more processors to display a breathing guidance model generated based on the 3-D virtual representation for the subject to follow during the coached breathing, the breathing guidance model showing a target motion of a personalized, modified shape of the 3-D virtual representation superimposed on the 3-D virtual representation while the subject breathes, the target motion including displaying a target 3-D virtual representation at each increment of time of a plurality of increments of time over each breathing cycle of the coached breathing, the breathing cycle including one inhalation and one exhalation, the target 3-D virtual representation based on a distance between each point of the first cloud of points and a corresponding point of the second cloud of points and an elapsed duration of the breathing cycle. In a fourth example of the system, optionally including one or more or each of the first through third examples, further instructions are stored in the non-transitory memory of the medical imaging system that, when executed, cause the one or more processors to generate a stability score for the subject based on a stability of the chest of the subject during a performance of the coached breathing during a medical imaging scan, and store the stability score in scan data acquired during the medical imaging scan.

The disclosure also provides support for a method, comprising: at a first point in time: during a medical imaging scan of a subject via a medical imaging system, acquiring scan data while the subject is performing coached breathing, generating a stability score for the medical imaging scan based on a stability of a chest of the subject during performance of the coached breathing by the subject, storing the stability score in the scan data acquired during the medical imaging scan, and at a second, later point in time: retrieving the scan data from a storage device of the medical imaging system based on a filter setting for stability scores of the medical imaging system.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A medical imaging system, comprising:
an X-ray controller including one or more processors having executable instructions stored in a non-transitory memory of the medical imaging system that, when executed, cause the one or more processors to:
generate a three-dimensional (3-D) virtual representation of a portion of a surface of a chest and/or abdomen of a subject of the medical imaging system, the portion adjustable in size by an operator of the medical imaging system;
display changes in the 3-D virtual representation to the subject on a display device of the medical imaging system while the subject performs coached breathing, in real time;
display instructions to the subject on the display device to perform the coached breathing in accordance with a selected breathing pattern, using the 3-D virtual representation as a guide;
in response to detecting a deviation of a breathing pattern of the subject from the selected breathing pattern, indicate the deviation to the subject; and
generate a stability score for the subject based on a stability of the chest and/or abdomen of the subject during a performance of the coached breathing during a medical imaging scan, and store the stability score in scan data acquired during the medical imaging scan.

2. The medical imaging system of claim 1, wherein the one or more processors are configured to display the instructions to the subject and detect the deviation of the breathing pattern of the subject from the selected breathing pattern based on further instructions stored in the non-transitory memory, that when executed, cause the one or more processors to:
during a first stage of coached breathing:
instruct the subject to inhale and hold their breath;
generate a first reference set of 3-D points associated with the portion of the surface of the chest and/or abdomen while the subject is holding their breath;
at regular intervals while the subject is performing the coached breathing:
generate a first set of 3-D points associated with the portion of the surface of the chest and/or abdomen;
calculate a first Euclidean distance between the first reference set of 3-D points and the generated first set of 3-D points;
determine whether the first Euclidean distance exceeds a threshold distance; and
during a second stage of coached breathing:
instruct the subject to exhale and hold their breath;
generate a second reference set of 3-D points associated with the portion of the surface of the chest and/or abdomen while the subject is holding their breath;
at regular intervals while the subject is performing the coached breathing:
generate a second set of 3-D points associated with the portion of the surface of the chest and/or abdomen;
calculate a second Euclidean distance between the second reference set of 3-D points and the generated second set of 3-D points; and
determine whether the second Euclidean distance exceeds a threshold distance.

3. The medical imaging system of claim 2, wherein the one or more processors are configured to generate the set of 3-D points associated with the portion of the surface of the chest and/or abdomen based on further instructions stored in the non-transitory memory, that when executed, cause the one or more processors to:
create a 3-D point cloud from data of the surface of the chest and/or abdomen acquired via one of a LiDAR system and a 3-D camera;
perform a segmentation of the 3-D point cloud to eliminate points not included on the subject;
isolate a first portion of a first 3-D point cloud associated with the portion of the surface; and
measure 3-D coordinates of the isolated first portion to generate the set of 3-D points associated with the portion of the surface.

4. The medical imaging system of claim 2, wherein further instructions are stored in the non-transitory memory of the medical imaging system that, when executed, cause the one or more processors to display a breathing guidance model generated based on the 3-D virtual representation for the subject to follow during the coached breathing, the breathing guidance model showing a target motion of a personalized, modified shape of the 3-D virtual representation superimposed on the 3-D virtual representation while the subject breathes, the target motion including displaying a target 3-D virtual representation at each increment of time of a plurality of increments of time over a plurality of breathing cycles of the coached breathing, each breathing cycle including one inhalation and one exhalation, the target 3-D virtual representation based on a distance between the first reference set of 3-D points and the second reference set of 3-D points and an elapsed duration of the breathing cycle.

\* \* \* \* \*